US012318038B2

(12) United States Patent
Masek et al.

(10) Patent No.: US 12,318,038 B2
(45) Date of Patent: Jun. 3, 2025

(54) SLIDABLE WASTE MANAGEMENT SYSTEMS FOR COOKBOXES OF GRILLS

(71) Applicant: Weber-Stephen Products LLC, Palatine, IL (US)

(72) Inventors: Douglas W. Masek, Palatine, IL (US); James Keclik, McHenry, IL (US); Michael A. Graef, Aurora, IL (US); Brian Mathews, Sycamore, IL (US); Nathan Mellas, Lenoir City, TN (US); Nathan Ioriatti, Saint Charles, IL (US); Nicholas M. Nanos, Jr., Crystal Lake, IL (US)

(73) Assignee: Weber-Stephen Products LLC, Palatine, IL (US)

( * ) Notice: Subject to any disclaimer, the term of this patent is extended or adjusted under 35 U.S.C. 154(b) by 780 days.

(21) Appl. No.: 17/472,295

(22) Filed: Sep. 10, 2021

(65) Prior Publication Data
US 2022/0167792 A1 Jun. 2, 2022

Related U.S. Application Data

(60) Provisional application No. 63/203,969, filed on Aug. 5, 2021, provisional application No. 63/120,537, filed on Dec. 2, 2020.

(51) Int. Cl.
A47J 37/07 (2006.01)
(52) U.S. Cl.
CPC ....... A47J 37/0786 (2013.01); A47J 37/0704 (2013.01)
(58) Field of Classification Search
None
See application file for complete search history.

(56) References Cited

U.S. PATENT DOCUMENTS 4,186,979 A 2/1980 Litchfield
4,526,158 A * 7/1985 Lee ............... A47J 37/0763
126/25 A
(Continued)

FOREIGN PATENT DOCUMENTS

CN 109864606 A 6/2019
DE 202012100587 7/2013
(Continued)

OTHER PUBLICATIONS

International Searching Authority, "International Search Report and Written Opinion," issued in connection with International Patent Application No. PCT/US2021/054235, mailed Jan. 11, 2022, 10 pages.
(Continued)

Primary Examiner — John J Norton
(74) Attorney, Agent, or Firm — Avantech Law

(57) ABSTRACT

Slidable waste management systems for cookboxes of grills are disclosed. An example waste management system is configured to be coupled to a cookbox of a grill. The example waste management system includes a first guide rail and a second guide rail that are couplable to the cookbox, The example waste management system further includes a waste tray slidably coupled to the first guide rail and the second guide rail. The waste tray is movable between a closed configuration and an open configuration. The waste tray has an upper opening and a lower opening. The upper opening is configured to receive waste from the cookbox when the waste tray is in the closed configuration. The example waste management system further includes a waste bin coupled to and located below the waste tray. The waste bin is configured to receive the waste from the waste tray via the lower opening.

21 Claims, 35 Drawing Sheets

(56) References Cited

U.S. PATENT DOCUMENTS

| | | | |
|---|---|---|---|
| 5,016,607 | A | 5/1991 | Doolittle et al. |
| 5,865,099 | A * | 2/1999 | Waugh .............. A47J 37/0704 |
| | | | 126/41 R |
| 6,363,925 | B1 * | 4/2002 | Chavana, Jr. ...... A47J 37/0731 |
| | | | 126/25 R |
| 8,109,263 | B2 | 2/2012 | Pliml |
| 8,794,131 | B2 | 8/2014 | Lai et al. |
| 9,854,939 | B2 | 1/2018 | Maurer |
| 9,883,770 | B2 | 2/2018 | Hunt et al. |
| 10,016,089 | B2 | 7/2018 | Necsuliu |
| D843,771 | S | 3/2019 | Wong |
| 10,455,979 | B2 | 10/2019 | Colston et al. |
| 2009/0183729 | A1 | 7/2009 | Barkhouse et al. |
| 2011/0271949 | A1 | 11/2011 | Ortner et al. |
| 2012/0090593 | A1 * | 4/2012 | Urquhart .............. A47J 37/079 |
| | | | 126/25 B |
| 2012/0234308 | A1 * | 9/2012 | Faulk .................. A47J 37/0713 |
| | | | 126/25 R |
| 2016/0037969 | A1 | 2/2016 | Renner |
| 2017/0020336 | A1 | 1/2017 | Cole et al. |
| 2017/0319007 | A1 | 11/2017 | Bowens et al. |
| 2018/0153346 | A1 | 6/2018 | Simms, II et al. |
| 2018/0168392 | A1 | 6/2018 | Thunga |
| 2018/0192823 | A1 * | 7/2018 | Nureddine .............. A23L 5/10 |
| 2018/0228317 | A1 | 8/2018 | Hunt et al. |
| 2018/0338641 | A1 | 11/2018 | Yaghotian et al. |
| 2020/0093145 | A1 * | 3/2020 | Powell ................ A47J 37/0754 |
| 2020/0237147 | A1 | 7/2020 | Donnelly et al. |
| 2020/0268204 | A1 | 8/2020 | Hasenour |
| 2024/0423412 | A1 * | 12/2024 | West .................... A47J 37/079 |

FOREIGN PATENT DOCUMENTS

| | | |
|---|---|---|
| EP | 590788 | 4/1994 |
| EP | 3217850 | 12/2020 |
| JP | 2001222356 | 8/2001 |

OTHER PUBLICATIONS

Taiwan Intellectual Property Office, "Preliminary review and refusal," issued in connection with Taiwanese Patent Application No. 110139511, mailed on Aug. 9, 2023, 4 Pages. (English language machine translation).

Australian Government, IP Australia, "Examination report No. 1 for standard patent application," issued in connection with Australian Application No. 2021390435, Nov. 23, 2023, 3 pages.

Taiwan Intellectual Property Office, "First Examination Opinion and Search Report," issued in connection with Taiwanese Patent Application No. 110139511, dated Apr. 24, 2023, 18 Pages.

International Bureau, "International Preliminary Report on Patentability," issued in connection with International Patent Application No. PCT/US2021/054235, mailed on Jun. 15, 2023, 7 pages.

Canadian Intellectual Property Office, "Examiner Requisition," issued in connection with Canadian Patent Application No. 3,181,450, dated Apr. 22, 2024, 4 pages.

Australian Government, IP Australia, "Examination Report No. 2," issued in connection with Australian Patent Application No. 2021390435, dated Jun. 18, 2024, 5 pages.

Australian Government, IP Australia, "Notice of Acceptance," issued in connection with Australian Patent Application No. 2021390435, dated Aug. 13, 2024, 3 pages.

European Patent Office, "Extended European Search Report," issued in connection with European Patent Application No. 21901220.0, dated Oct. 10, 2024, 8 pages.

China National Intellectual Property Administration, "Office Action," issued in connection with Chinese Patent Application No. 202180044078.1, dated Jan. 22, 2025, 18 pages (including machine-generated translation).

China National Intellectual Property Administration, "Office Action," issued in connection with Chinese Patent Application No. 202180044078.1, dated Apr. 17, 2025, 10 pages (including machine-generated translation).

* cited by examiner

SECTION A-A

SECTION B-B

SECTION C-C

SECTION D-D

SECTION F-F

SECTION G-G

SECTION H-H

SLIDABLE WASTE MANAGEMENT SYSTEMS FOR COOKBOXES OF GRILLS

RELATED APPLICATIONS

This application claims priority to U.S. Provisional Patent Application No. 63/203,969, filed Aug. 5, 2021, and to U.S. Provisional Patent Application No. 63/120,537, filed Dec. 2, 2020. The entireties of U.S. Provisional Patent Application No. 63/203,969 and U.S. Provisional Patent Application No. 63/120,537 are hereby incorporated by reference herein.

FIELD OF THE DISCLOSURE

This disclosure relates generally to waste management systems and, more specifically, to slidable waste management systems for cookboxes of grills.

BACKGROUND

Grills (e.g., gas grills, charcoal grills, pellet grills, electric grills, etc.) are conventionally equipped with a cookbox configured to warm, heat, and/or cook one or more food item(s), and a waste management system located below the cookbox and configured to receive, collect, and/or store waste (e.g. grease, ash, and/or other residual cooking matter) that passes through a lower opening of the cookbox into the waste management system. Waste management systems of some known grills include a waste tray located and/or positioned below the cookbox, and a waste bin located and/or positioned below the waste tray. In some implementations of such known waste management systems, the waste tray includes an upper opening located below the lower opening of the cookbox, and a lower opening located below the upper opening of the waste tray. The upper opening of the waste tray is vertically aligned with the lower opening of the cookbox, and the waste bin is vertically aligned with the lower opening of the waste tray.

In some such known implementations, a user of the grill can manually remove the waste tray from its location and/or position beneath the cookbox by lifting the waste tray off of a pair of support brackets that otherwise rigidly hold the waste tray in place. The user may elect to remove the waste tray from beneath the cookbox in this manner to better facilitate the manual removal of accumulated waste off of or out of the waste tray. Absent such manual removal of the waste tray from beneath the cookbox, the user's only other means of accessing the waste tray to facilitate the aforementioned manual removal of accumulated waste typically requires the user to manually remove one or more cooking grate(s), one or more grease deflection bar(s), and potentially one or more burner tube(s) that are located within the cookbox above and/or over the waste tray. The removal of accumulated waste (either from the waste tray or the waste bin) of such known implementations is further hampered by the waste bin not being coupled to the waste tray. For example, in instances where the user elects to manually remove the waste tray from beneath the cookbox, the waste bin (which is not coupled to the waste tray) is left behind. In such instances, waste passing through the lower opening of the waste tray that would otherwise be captured and/or collected with the underlying waste bin instead falls from the lower opening of the waste tray unabated. The ensuing mess is typically undesirable.

Figure 1:
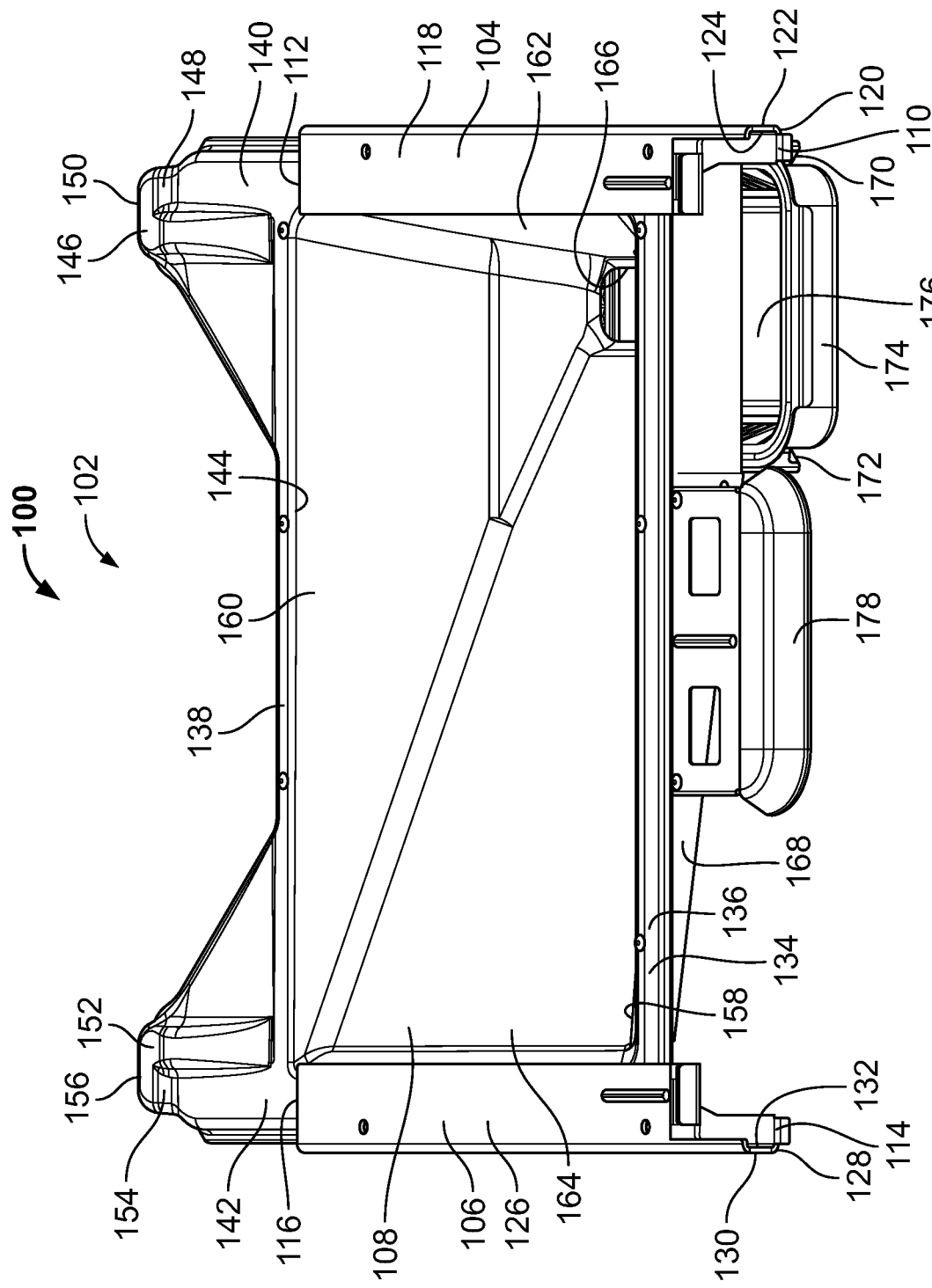
FIG. 1 is a perspective view of an example waste management system constructed in accordance with teachings of this disclosure, with the waste management system shown positioned in an example closed configuration.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness.

Descriptors "first," "second," "third," etc. are used herein when identifying multiple elements or components which may be referred to separately. Unless otherwise specified or understood based on their context of use, such descriptors are not intended to impute any meaning of priority or ordering in time but merely as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Example waste management systems disclosed herein are advantageously configured to be movable (e.g., slidable) relative to a cookbox of a grill, with a waste tray of the waste management systems being movable (e.g., slidable) from a closed configuration relative to the cookbox into an open configuration relative to the cookbox. In some disclosed examples, an upper opening of the waste tray is vertically aligned with a lower opening of the cookbox when the waste management system is in the closed configuration. In some such disclosed examples, the upper opening of the waste tray is no longer vertically aligned with the lower opening of the cookbox when the waste management system is in the open configuration. In some such disclosed examples, the upper opening of the waste tray is instead located forward of the lower opening of the cookbox when the waste management system is in the open configuration.

Example waste management systems disclosed herein are advantageously moveable (e.g., slidable) between the aforementioned closed and open configurations via a handle coupled to the front of the waste tray and/or, more generally, to the front of the waste management system. In some disclosed examples, a user can transition the waste management system from the closed configuration into the open configuration by pulling the handle of the waste management system in a forward direction. Conversely, the user can transition the waste management system from the open configuration into the closed configuration by pushing the handle of the waste management system in a rearward direction.

Transitioning the waste management system from the closed configuration into the open configuration advantageously enables the user to more easily clean and/or remove waste (e.g., grease, ash, and/or other residual cooking matter) from the waste tray relative to the effort which the user would otherwise exert to clean and/or remove such waste from the waste tray in the absence of the waste management system. In this regard, the user can simply slide the waste tray of the waste management system forward from beneath the cookbox, with the interior of the waste tray then being freely accessible to the user, and with the waste tray advantageously being suspended in place at such a location via support rails of the waste management system. The ability to easily place the waste tray in such a position provides a superior cleanability option relative to those provided by the known waste management systems described above.

In some disclosed examples, the waste management system further includes a waste bin that is advantageously coupled to, and movable (e.g., slidable) along with, the waste tray of the waste management system. As a result of the waste bin being coupled to the waste tray, waste that is removed off of and/or out of the waste tray via a lower opening of the waste tray while the waste management system is in the open configuration will be captured and/or collected in the underlying waste bin. For example, the aforementioned arrangement between the waste tray and the waste bin enables a user to scrape (e.g., via a scraping tool) waste from a location on the waste tray toward, into, and/or through the lower opening of the waste tray, with such waste thereafter passing into the underlying waste bin. Such waste removal can advantageously be performed by the user in a manner that is generally hands-free, with the exception of the user having to hold the scraping tool. The ability to perform waste removal in a manner that is effectively hands-free further enhances the superior cleanability options provided by the disclosed waste management systems relative to those provided by the known waste management systems described above.

Slidable waste management systems disclosed herein accordingly provide enhanced cleanability and/or waste removal opportunities associated with waste passing through and/or out of a cookbox of a grill. The above-identified features as well as other advantageous features of example slidable waste management systems disclosed herein are further described below in connection with the figures of the application. As used herein, the term "configured" means sized, shaped, arranged, structured, oriented, positioned and/or located. For example, in the context of a first object configured to fit within a second object, the first object is sized, shaped, arranged, structured, oriented, positioned and/or located to fit within the second object. As used herein in the context of a first object circumscribing a second object, the term "circumscribe" means that the first object is constructed around and/or defines an area around the second object. In interpreting the term "circumscribe" as used herein, it is to be understood that the first object circumscribing the second object can include gaps and/or can consist of multiple spaced-apart objects, such that a boundary formed by the first object around the second object is not necessarily a continuous boundary. For example, a plurality of trees can circumscribe a field.

Figure 2:
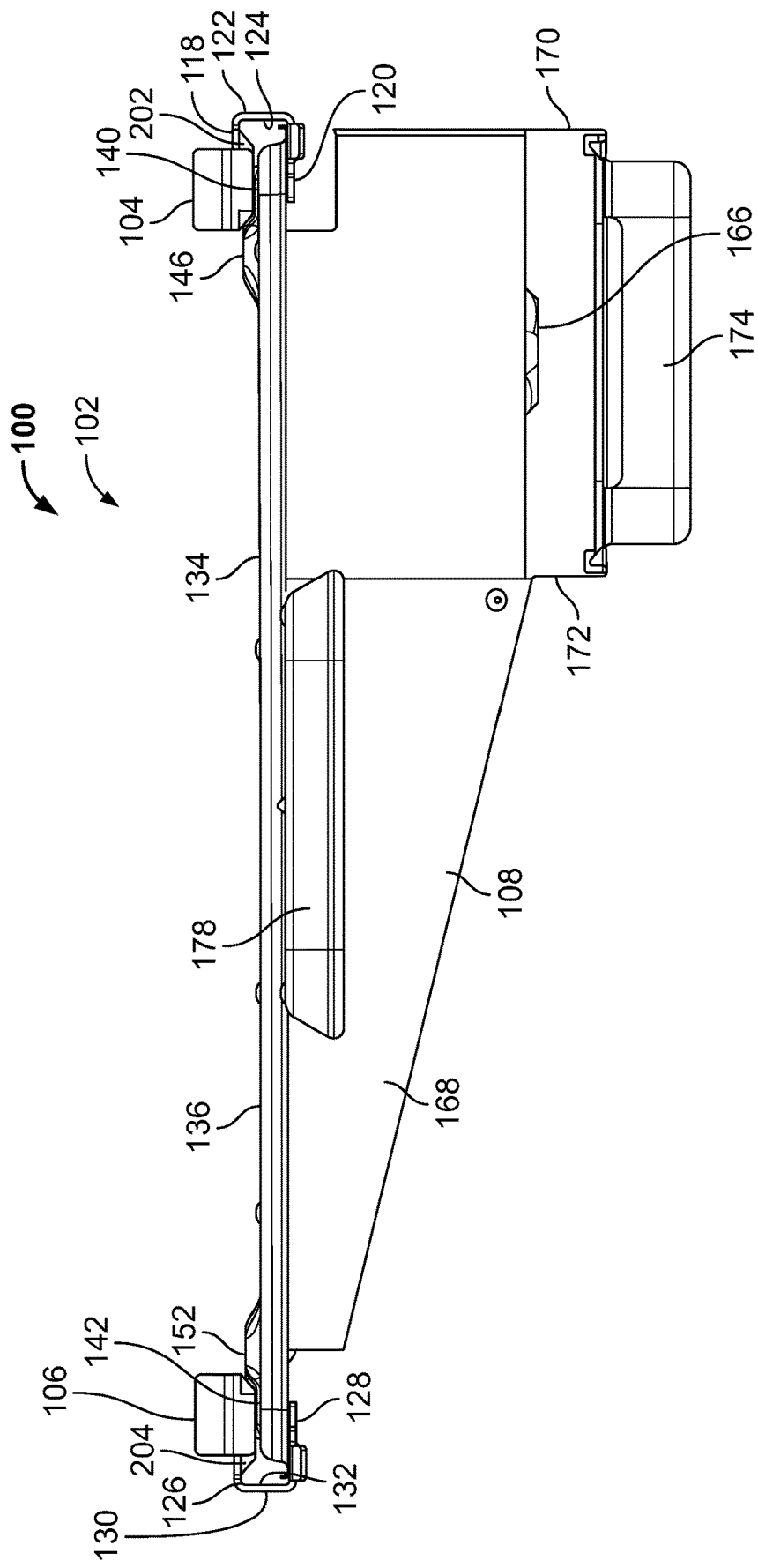
FIG. 2 is a front view of the waste management system of FIG. 1, with the waste management system shown positioned in the closed configuration of FIG. 1.
Figure 3:
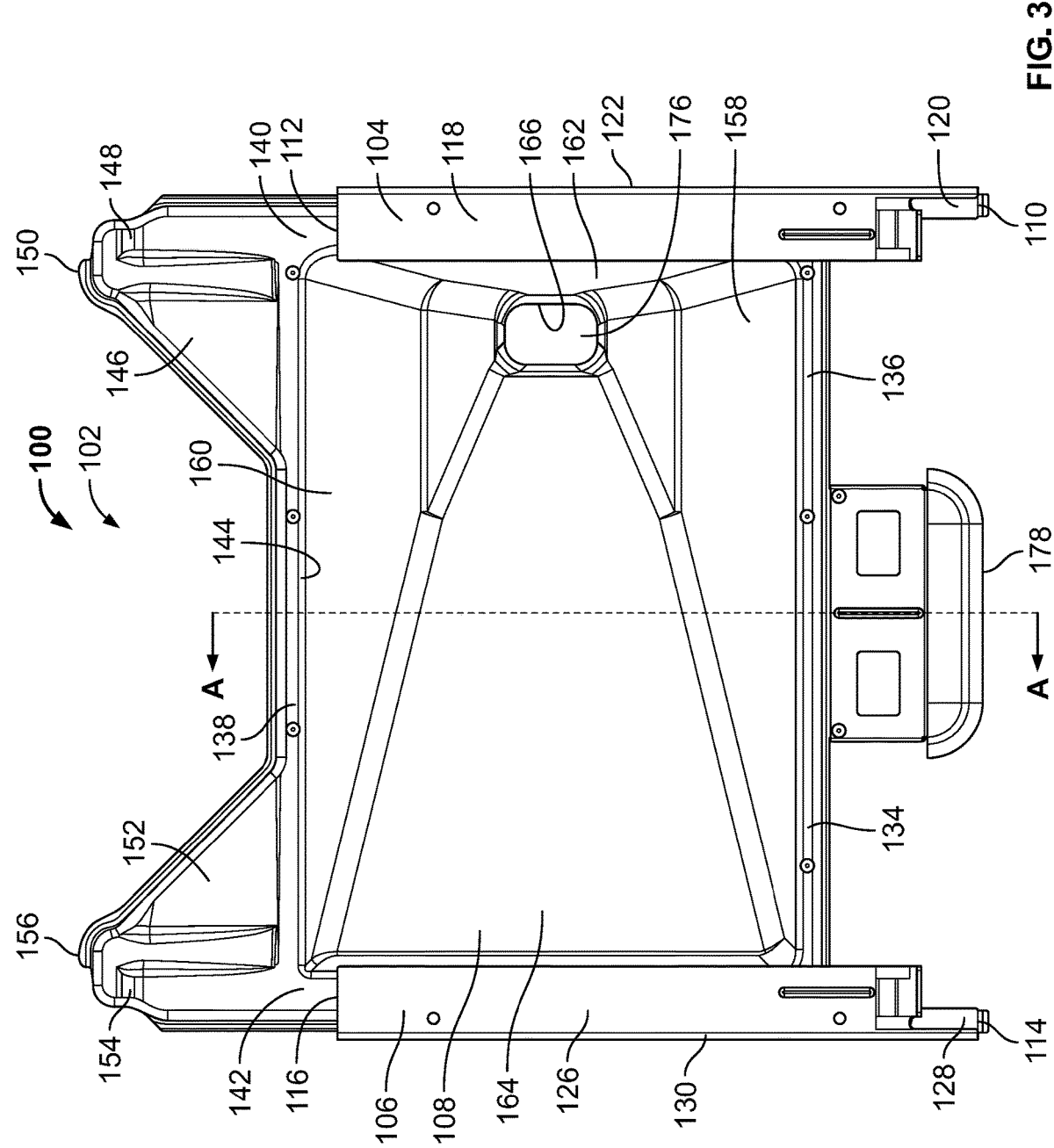
FIG. 3 is a top view of the waste management system of FIGS. 1 and 2, with the waste management system shown positioned in the closed configuration of FIGS. 1 and 2.
Figure 4:
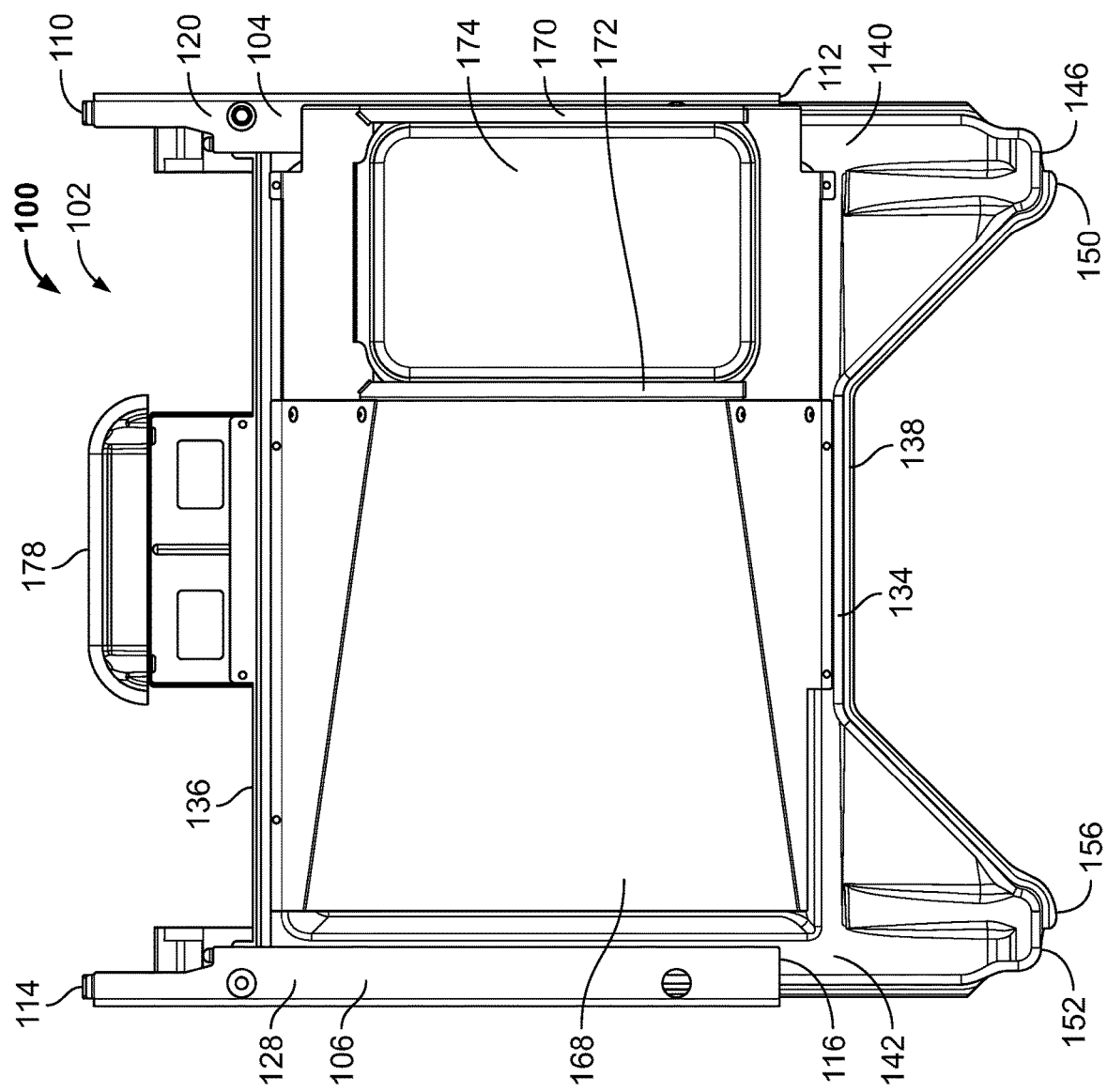
FIG. 4 is a bottom view of the waste management system of FIGS. 1-3, with the waste management system shown positioned in the closed configuration of FIGS. 1-3.
Figure 5:
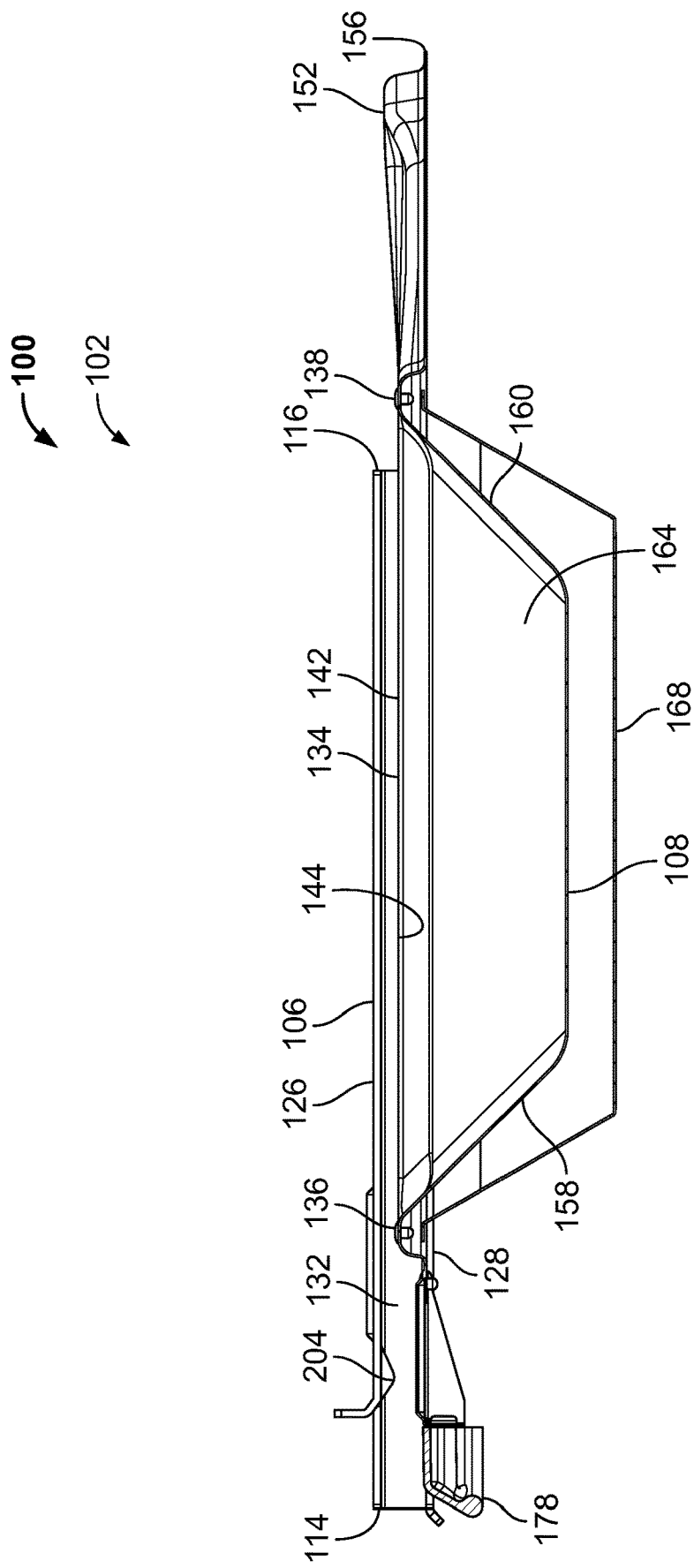
FIG. 5 is a cross-sectional view of the waste management system of FIGS. 1-4 taken along section A-A of FIG. 3, with the waste management system shown positioned in the closed configuration of FIGS. 1-4.

FIG. 1 is a perspective view of an example waste management system 100 constructed in accordance with teachings of this disclosure, with the waste management system 100 shown positioned in an example closed configuration 102. FIG. 2 is a front view of the waste management system 100 of FIG. 1, with the waste management system 100 shown positioned in the closed configuration 102 of FIG. 1. FIG. 3 is a top view of the waste management system 100 of FIGS. 1 and 2, with the waste management system 100 shown positioned in the closed configuration 102 of FIGS. 1 and 2. FIG. 4 is a bottom view of the waste management system 100 of FIGS. 1-3, with the waste management system 100 shown positioned in the closed configuration 102 of FIGS. 1-3. FIG. 5 is a cross-sectional view of the waste management system 100 of FIGS. 1-4 taken along section A-A of FIG. 3, with the waste management system 100 shown positioned in the closed configuration 102 of FIGS. 1-4.

In the illustrated example of FIGS. 1-5, the waste management system 100 includes an example first (e.g., right) guide rail 104, an example second (e.g., left) guide rail 106, and an example waste tray 108 extending between and slidably coupled to the first guide rail 104 and the second guide rail 106. The first guide rail 104 of FIGS. 1-5 includes an example first end 110 and an example second end 112 located opposite the first end 110. The first end 110 of the first guide rail 104 defines a front end of the first guide rail 104, and the second end 112 of the first guide rail 104 defines a rear end of the first guide rail 104. Similarly, the second guide rail 106 of FIGS. 1-5 includes an example first end 114 and an example second end 116 located opposite the first end 114. The first end 114 of the second guide rail 106 defines a front end of the second guide rail 106, and the second end 116 of the second guide rail 106 defines a rear end of the second guide rail 106.

The first guide rail 104 of the waste management system 100 has a length ($L_1$) defined by the first end 110 and the second end 112 of the first guide rail 104. Similarly, the second guide rail 106 of the waste management system 100 has a length ($L_2$) defined by the first end 114 and the second end 116 of the second guide rail 106. In the illustrated example of FIGS. 1-5, the respective lengths ($L_1$, $L_2$) of the first guide rail 104 and the second guide rail 106 are substantially equal. In other examples, the respective lengths ($L_1$, $L_2$) of the first guide rail 104 and the second guide rail 106 can differ from one another. As shown in FIGS. 1-5, the first guide rail 104 is substantially parallel to the second guide rail 106, and is located and/or positioned at substantially the same elevation and/or height as the second guide rail 106. In the illustrated example of FIGS. 1-5, the first guide rail 104 and the second guide rail 106 are spaced apart from one another by a distance that is sufficient to accommodate the waste tray 108 therebetween.

The first guide rail 104 of FIGS. 1-5 has a generally C-shaped cross-sectional profile including an example upper segment 118, and example lower segment 120 spaced apart from and located opposite the upper segment 118, an example outer segment 122 extending between the upper segment 118 and the lower segment 120, and an example inwardly-facing opening 124 collectively defined by the upper segment 118, the lower segment 120, and the outer segment 122. The upper segment 118 of the first guide rail 104 is configured to be coupled (e.g., rigidly and/or fixedly coupled) to a cookbox of a grill. The lower segment 120 of the first guide rail 104 is configured to carry and/or support a right ledge of the waste tray 108, with the right ledge of the waste tray 108 being received via the inwardly-facing opening 124 of the first guide rail 104 and laterally bound by the outer segment 122 of the first guide rail 104. The upper segment 118 of the first guide rail 104 includes an example stop tab 202 extending downwardly from the upper segment 118, with the stop tab 202 being configured to prevent the right ledge of the waste tray 108 from sliding off of and/or out of the first guide rail 104 in a forward direction, as further described below.

The second guide rail 106 of FIGS. 1-5 is constructed as a mirror image of the first guide rail 104 of FIGS. 1-5 described above. In this regard, the second guide rail 106 of FIGS. 1-5 has a generally C-shaped cross-sectional profile including an example upper segment 126, and example lower segment 128 spaced apart from and located opposite the upper segment 126, an example outer segment 130 extending between the upper segment 126 and the lower segment 128, and an example inwardly-facing opening 132 collectively defined by the upper segment 126, the lower segment 128, and the outer segment 130. The upper segment 126 of the second guide rail 106 is configured to be coupled (e.g., rigidly and/or fixedly coupled) to a cookbox of a grill. The lower segment 128 of the second guide rail 106 is configured to carry and/or support a left ledge of the waste tray 108, with the left ledge of the waste tray 108 being received via the inwardly-facing opening 132 of the second guide rail 106 and laterally bound by the outer segment 130 of the second guide rail 106. The upper segment 126 of the second guide rail 106 includes an example stop tab 204 extending downwardly from the upper segment 126, with the stop tab 204 being configured to prevent the left ledge of the waste tray 108 from sliding off of and/or out of the second guide rail 106 in a forward direction, as further described below.

The first guide rail 104 and the second guide rail 106 of the waste management system 100 are respectively configured to carry and/or support the waste tray 108 of the waste management system 100, with the waste tray 108 being slidably coupled to the first guide rail 104 and the second guide rail 106. In the illustrated example of FIGS. 1-5, the waste tray 108 includes an example frame 134 having an example front ledge 136, and example rear ledge 138 spaced apart from the front ledge 136, an example right ledge 140 extending between the front ledge 136 and the rear ledge 138, and an example left ledge 142 spaced apart from the right ledge 140 and extending between the front ledge 136 and the rear ledge 138. The frame 134 further includes and/or defines an example upper opening 144 located between the front ledge 136, the rear ledge 138, the right ledge 140, and the left ledge 142 of the frame 134. In the illustrated example of FIGS. 1-5, the upper opening 144 of the waste tray 108 has a generally rectangular profile. In other examples, the upper opening 144 of the waste tray 108 can instead have a non-rectangular profile (e.g., a circular profile, an elliptical profile, a trapezoidal profile, a hexagonal profile, etc.).

The frame 134 of FIGS. 1-5 further includes an example first flange 146 extending rearwardly from the rear ledge 138 and the right ledge 140 of the frame 134. The first flange 146 includes and/or defines an example front stop 148 and an example rear stop 150. The front stop 148 of the first flange 146 is configured to contact and/or engage the stop tab 202 of the first guide rail 104 when the waste tray 108 of the waste management system 100 is moved (e.g. slid) forward along the first guide rail 104, with such contact and/or engagement preventing the waste tray 108 from sliding off of and/or out of the first guide rail 104 in a forward direction. The rear stop 150 of the first flange 146 is configured to contact and/or engage a rear wall of a base of a grill (e.g., in which the waste management system 100 is implemented) when the waste tray 108 of the waste management system 100 is moved (e.g. slid) rearward along the first guide rail 104, with such contact and/or engagement preventing the waste tray 108 from sliding off of and/or out of the first guide rail 104 in a rearward direction.

The frame 134 of FIGS. 1-5 further includes an example second flange 152 extending rearwardly from the rear ledge 138 and the left ledge 142 of the frame 134. The second flange 152 includes and/or defines an example front stop 154 and an example rear stop 156. The front stop 154 of the second flange 152 is configured to contact and/or engage the stop tab 204 of the second guide rail 106 when the waste tray 108 of the waste management system 100 is moved (e.g. slid) forward along the second guide rail 106, with such contact and/or engagement preventing the waste tray 108 from sliding off of and/or out of the second guide rail 106 in a forward direction. The rear stop 156 of the second flange 152 is configured to contact and/or engage a rear wall of a base of a grill (e.g., in which the waste management system 100 is implemented) when the waste tray 108 of the waste management system 100 is moved (e.g. slid) rearward along the second guide rail 106, with such contact and/or engagement preventing the waste tray 108 from sliding off of and/or out of the second guide rail 106 in a rearward direction.

The waste tray 108 of FIGS. 1-5 further includes an example front wall 158, and example rear wall 160 located opposite the front wall 158, an example right sidewall 162 extending between the front wall 158 and the rear wall 160, and an example left sidewall 164 located opposite the right sidewall 162 and extending between the front wall 158 and the rear wall 160. In the illustrated example of FIGS. 1-5, the front wall 158, the rear wall 160, the right sidewall 162, and the left sidewall 164 of the waste tray 108 respectively extend at an inwardly and downwardly sloping angle from the frame 134 of the waste tray 108. In this regard, the front wall 158 extends at an inwardly and downwardly sloping angle from the front ledge 136, the rear wall 160 extends at an inwardly and downwardly sloping angle from the rear ledge 138, the right sidewall 162 extends at an inwardly and downwardly sloping angle from the right ledge 140, and the left sidewall 164 extends at an inwardly and downwardly sloping angle from the left ledge 142.

Lower and/or bottom ends of the front wall 158, the rear wall 160, the right sidewall 162, and the left sidewall 164 collectively define an example lower opening 166 located between the front wall 158, the rear wall 160, the right sidewall 162, and the left sidewall 164 of the waste tray 108, with the lower opening 166 of the waste tray 108 being located below the upper opening 144 of the waste tray 108. The downwardly and inwardly sloping angles of the front wall 158, the rear wall 160, the right sidewall 162, and the left sidewall 164 cause waste (e.g., grease, ash, and/or other residual cooking matter) that passes from a cookbox of a grill through the upper opening 144 of the waste tray 108 to be fed (e.g., via gravitational forces, and/or via assistance from a user-operated tool) toward, into, and/or through the lower opening 166 of the waste tray 108. In the illustrated example of FIGS. 1-5, the lower opening 166 of the waste tray 108 has a generally rectangular profile. In other examples, the lower opening 166 of the waste tray 108 can instead have a non-rectangular profile (e.g., a circular profile, an elliptical profile, a trapezoidal profile, a hexagonal profile, etc.).

The waste tray 108 of FIGS. 1-5 further includes an example base 168. In the illustrated example of FIGS. 1-5, the base 168 of the waste tray 108 is located below and/or around the front wall 158, the rear wall 160, the right sidewall 162, and the left sidewall 164 of the waste tray 108, with the base 168 being a separate structure from the front wall 158, the rear wall 160, the right sidewall 162, and the left sidewall 164. Thus, as shown in FIGS. 1-5, the waste tray 108 includes a double-walled construction having an interior wall formed by the front wall 158, the rear wall 160, the right sidewall 162, and the left sidewall 164, and having an exterior wall formed by the base 168. In other examples, the base 168 can instead be integrally formed by the front wall 158, the rear wall 160, the right sidewall 162, and the left sidewall 164, with the modified waste tray 108 being of a single-walled construction.

The waste tray 108 of FIGS. 1-5 further includes an example first bracket 170 coupled to and extending downwardly from the base 168, and an example second bracket 172 coupled to and extending downwardly from the base 168. In the illustrated example of FIGS. 1-5, the first bracket 170 is located to the right of the lower opening 166 of the waste tray 108, and the second bracket 172 is located to the left of the lower opening 166 of the waste tray 108. In other examples, the first bracket 170 can instead be located to the front of the lower opening 166 of the waste tray 108, and the second bracket 172 can instead be located to the rear of the lower opening 166 of the waste tray 108.

The first bracket 170 and the second bracket 172 of FIGS. 1-5 are respectively configured to support and/or carry an example waste bin 174 of the waste management system 100, with the waste bin 174 being located below and vertically aligned with the lower opening 166 of the waste tray 108, and with the waste bin 174 being removable from the first bracket 170 and the second bracket 172. The waste bin 174 in turn is configured to support, carry, and/or contain an example disposable waste pan 176 that is removable from the waste bin 174. In some examples, the disposable waste pan 176 is configured as a removable metal (e.g., aluminum) liner that is intended to be periodically disposed of and replaced. The waste bin 174 and/or the disposable waste pan 176 is/are configured to receive, contain, and/or store waste (e.g., grease, ash, and/or other residual cooking matter) that passes out of the waste tray 108, with such waste passing through the lower opening 166 of the waste tray 108 into the waste bin 174 and/or the disposable waste pan 176. Received waste can subsequently be removed from the waste bin 174 and/or the disposable waste pan 176 by removing the disposable waste pan 176 from the waste bin 174, and/or by removing the waste bin 174 from the first bracket 170 and the second bracket 172. In the illustrated example of FIGS. 1-5, the waste bin 174 and the disposable waste pan 176 respectively have a generally rectangular profile. In other examples, the waste bin 174 and/or the disposable waste pan 176 can instead have a non-rectangular profile (e.g., a circular profile, an elliptical profile, a trapezoidal profile, a hexagonal profile, etc.).

The waste management system 100 of FIGS. 1-5 further includes an example handle 178. In the illustrated example of FIGS. 1-5, the handle 178 is coupled to and extends forwardly from the front ledge 136 of the frame 134 of the waste tray 108. In other examples, the handle 178 can instead be coupled to and extend forwardly from a front side of the base 168 of the waste tray 108. The handle 178 of the waste management system 100 can be of any shape and/or size that facilitates and/or enables the handle 178 being gripped and/or grasped by a finger and/or a hand of a user of the waste management system 100.

The handle 178 of FIGS. 1-5 is configured to enable a user to move (e.g., slide) the waste tray 108 of the waste management system 100 forward and/or rearward along and/or within the first guide rail 104 and the second guide rail 106 of the waste management system 100. Forward and/or rearward movement of the waste tray 108 (e.g., via the handle 178) along and/or within the first guide rail 104 and the second guide rail 106 causes a corresponding forward and/or rearward movement of the waste bin 174 that is carried and/or supported by the first bracket 170 and the second bracket 172 of the waste tray 108, as well as a corresponding forward and/or rearward movement of the disposable waste pan 176 that is carried, supported, and/or contained by the waste bin 174. The waste management system 100 of FIGS. 1-5 is configured such that a user can transition the waste management system 100 from the closed configuration 102 shown in FIGS. 1-5 into an open configuration (e.g., as shown and described below in connection with FIGS. 6-9) by pulling the handle 178 of the waste management system 100 in a forward direction. Conversely, the user can transition the waste management system 100 from the open configuration into the closed configuration 102 shown in FIGS. 1-5 by pushing the handle 178 of the waste management system 100 in a rearward direction.

Figure 6:
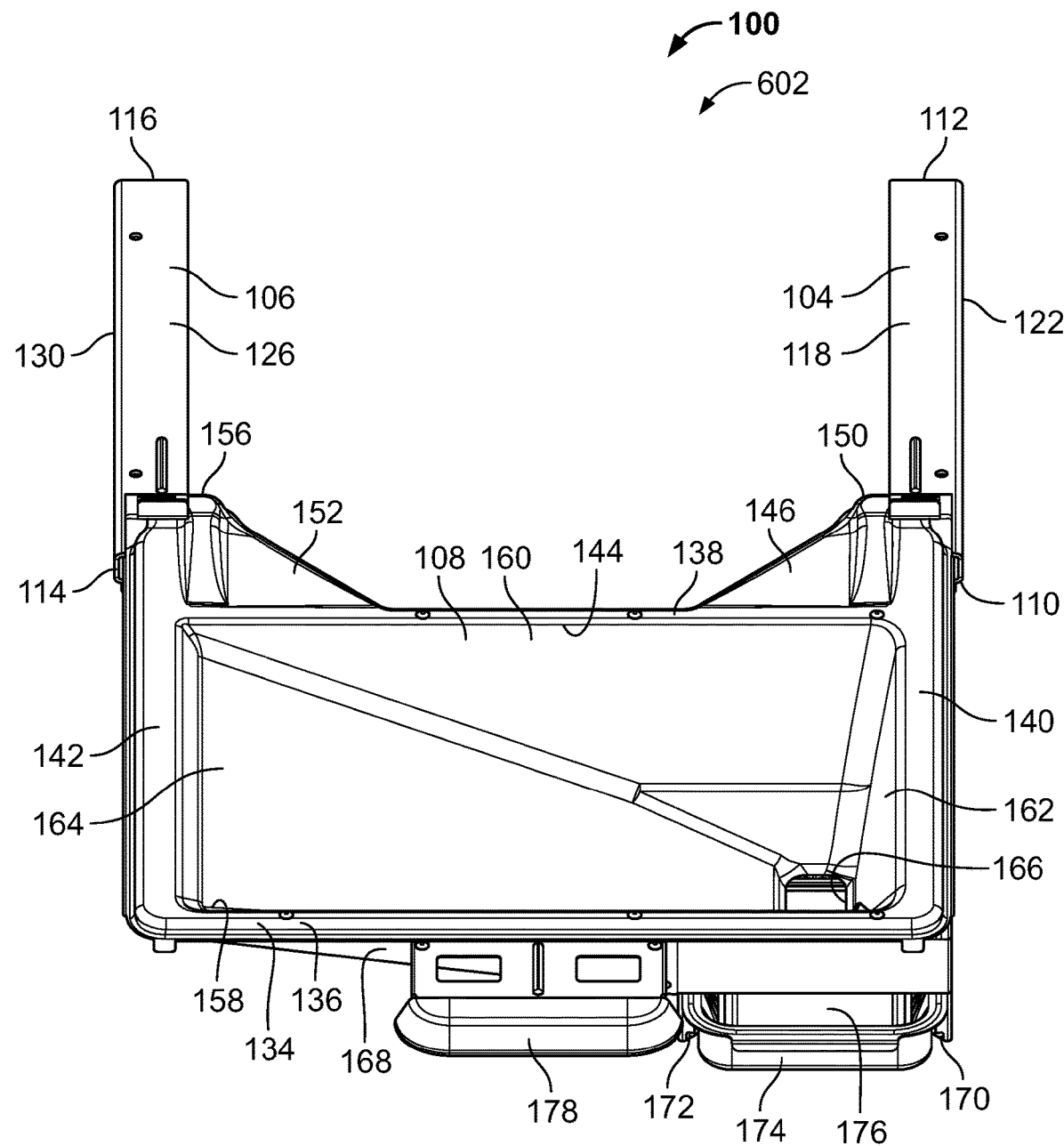
FIG. 6 is a perspective view of the waste management system of FIGS. 1-5, with the waste management system shown positioned in an example open configuration.
Figure 7:
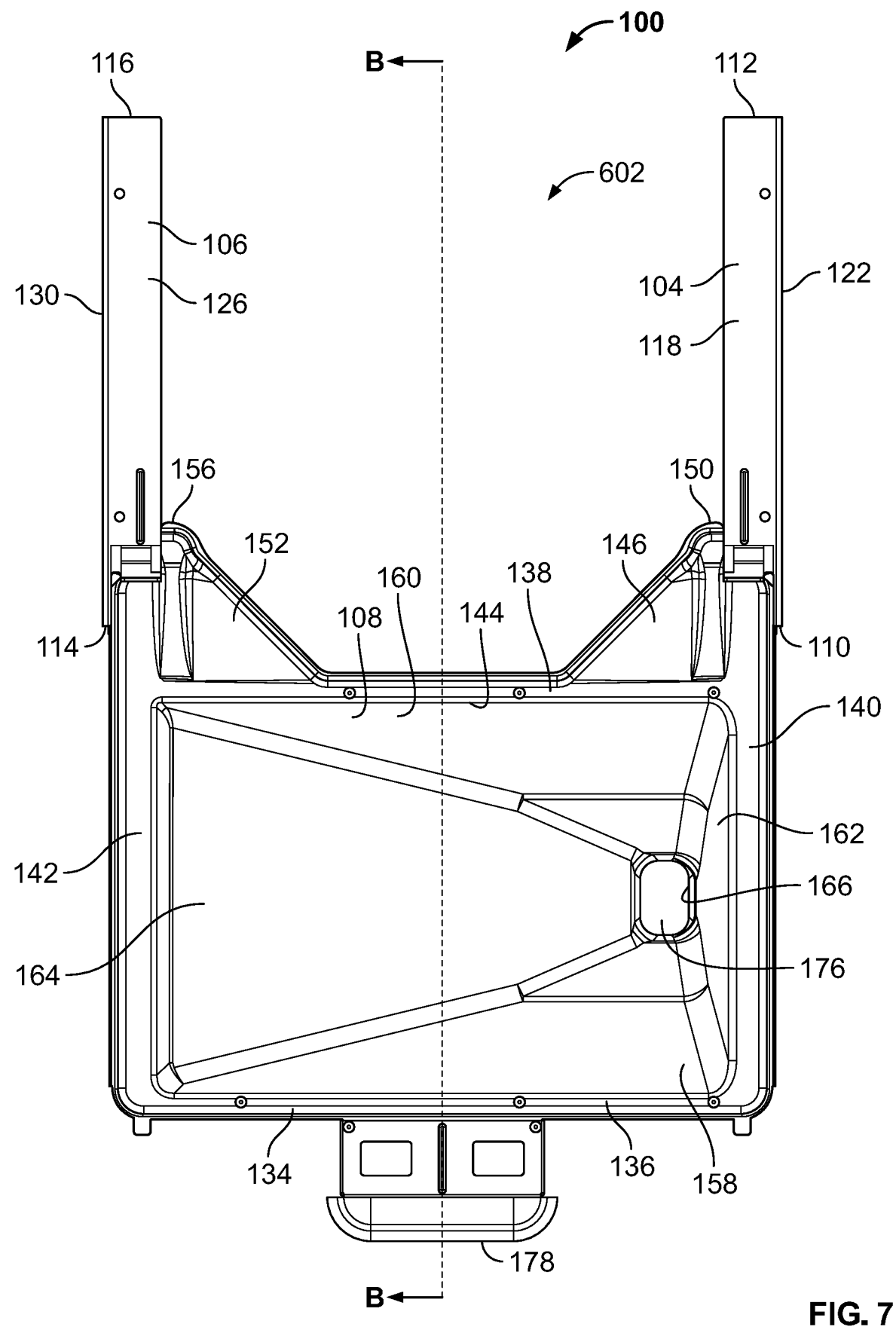
FIG. 7 is a top view of the waste management system of FIGS. 1-6, with the waste management system shown positioned in the open configuration of FIG. 6.
Figure 8:
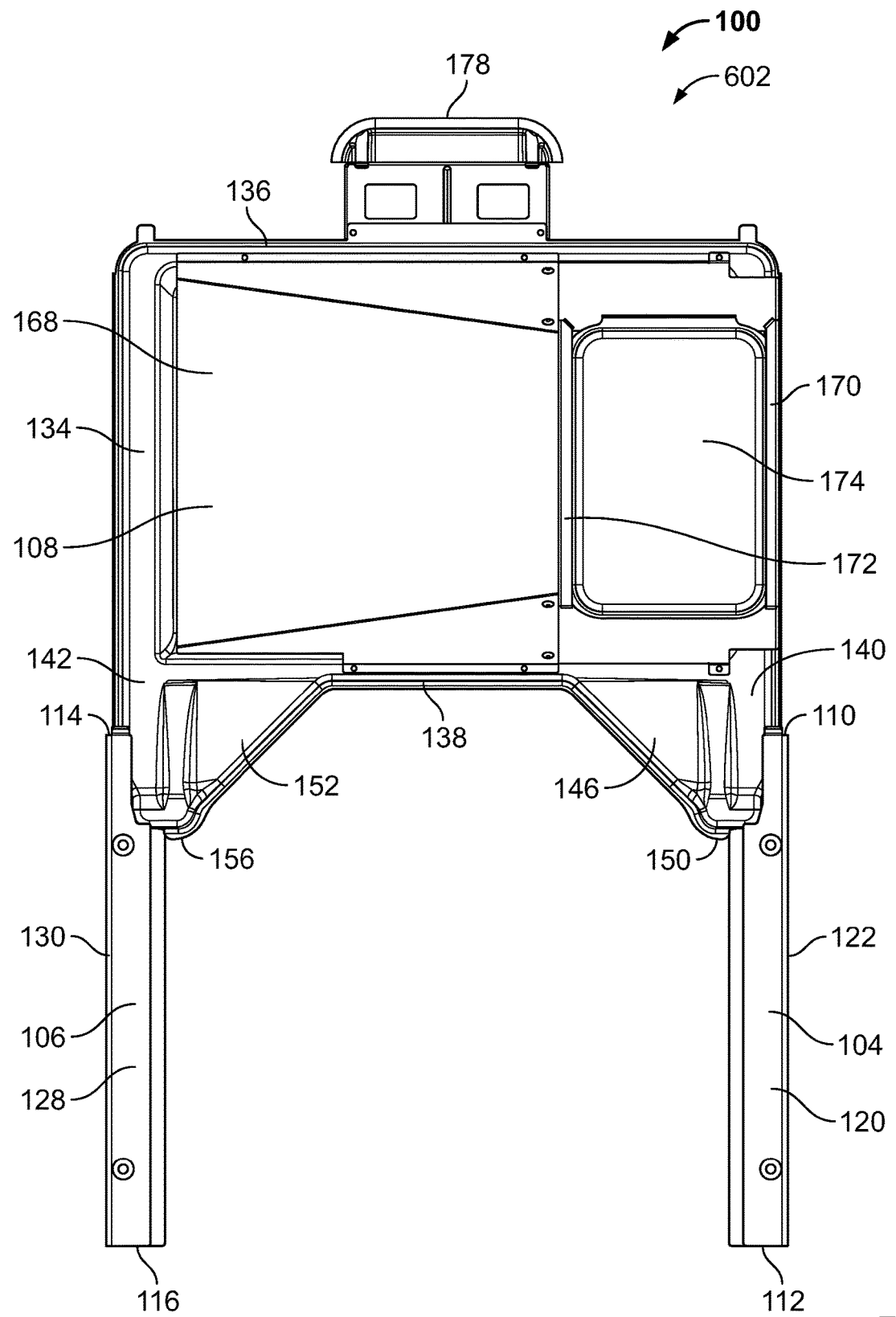
FIG. 8 is a bottom view of the waste management system of FIGS. 1-7, with the waste management system shown positioned in the open configuration of FIGS. 6 and 7.
Figure 9:
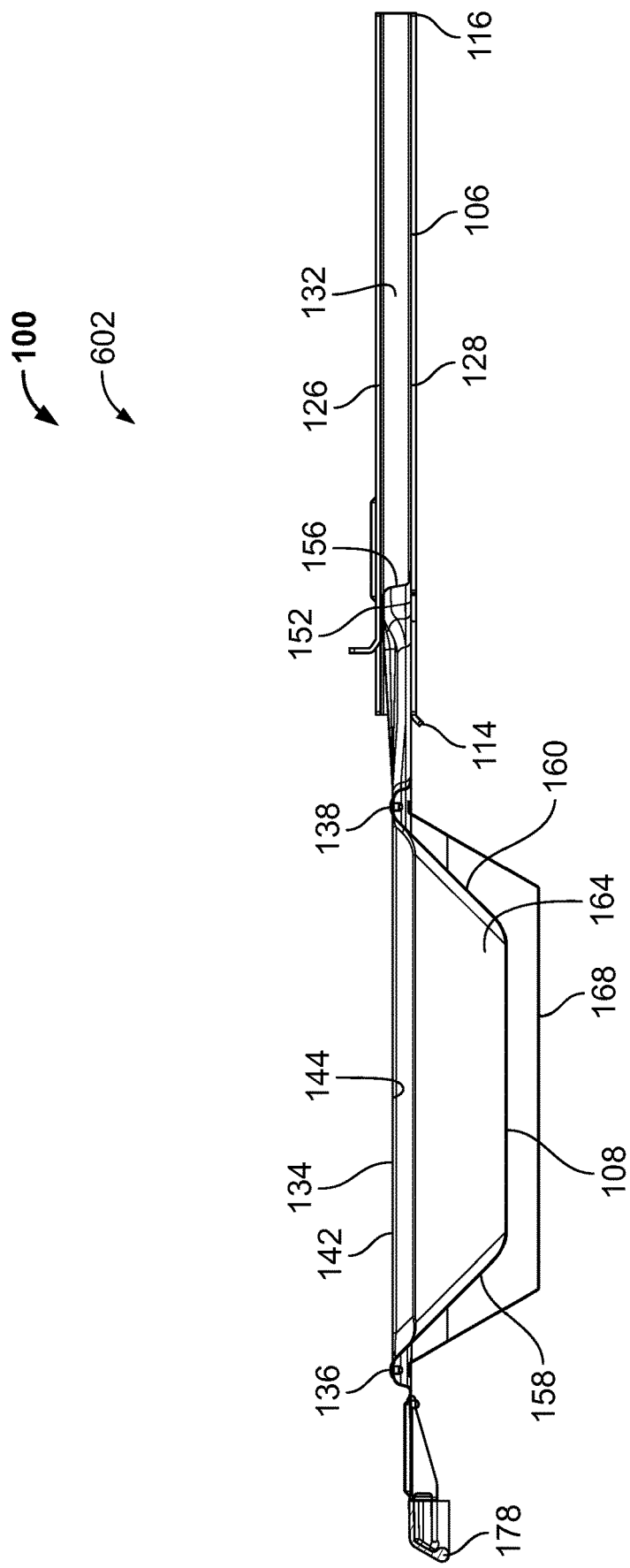
FIG. 9 is a cross-sectional view of the waste management system of FIGS. 1-8 taken along section B-B of FIG. 7, with the waste management system shown positioned in the open configuration of FIGS. 6-8.

FIG. 6 is a perspective view of the waste management system 100 of FIGS. 1-5, with the waste management system 100 shown positioned in an example open configuration 602. FIG. 7 is a top view of the waste management system 100 of FIGS. 1-6, with the waste management system 100 shown positioned in the open configuration 602 of FIG. 6. FIG. 8 is a bottom view of the waste management system 100 of FIGS. 1-7, with the waste management system 100 shown positioned in the open configuration 602 of FIGS. 6 and 7. FIG. 9 is a cross-sectional view of the waste management system 100 of FIGS. 1-8 taken along section B-B of FIG. 7, with the waste management system 100 shown positioned in the open configuration 602 of FIGS. 6-8.

In the illustrated example of FIGS. 6-9, the waste tray 108 of the waste management system 100 is forwardly extended (e.g., maximally forwardly extended) within the first guide rail 104 and the second guide rail 106 of the waste management system 100. The stop tab 202 of the first guide rail 104 is contacted by and/or engaged with the front stop 148 of the first flange 146 of the waste tray 108, and the stop tab 204 of the second guide rail 106 is contacted by and/or engaged with the front stop 154 of the second flange 152 of the waste tray 108. The aforementioned engagement between the stop tab 202 of the first guide rail 104 and the front stop 148 of the first flange 146 of the waste tray 108, and/or between the stop tab 204 of the second guide rail 106 and the front stop 154 of the second flange 152 of the waste tray 108 prevents the waste tray 108 from sliding off of and/or out of the first guide rail 104 and/or the second guide rail 106 in a forward direction.

A user of a grill including the waste management system 100 of FIGS. 1-9 can transition the waste management system 100 from the closed configuration 102 shown in FIGS. 1-5 into the open configuration 602 shown in FIGS. 6-9 by pulling the handle 178 of the waste management system 100 in a forward direction. Conversely, the user can transition the waste management system 100 of FIGS. 1-9 from the open configuration 602 shown in FIGS. 6-9 into the closed configuration 102 shown in FIGS. 1-5 by pushing the handle 178 of the waste management system 100 in a rearward direction. As further described below, transitioning the waste management system 100 from the closed configuration 102 shown in FIGS. 1-5 into the open configuration 602 shown in FIGS. 6-9 advantageously enables the user to more easily clean and/or remove waste (e.g., grease, ash, and/or other residual cooking matter) from the waste tray 108, the waste bin 174, and/or the disposable waste pan 176 relative to the effort which the user would otherwise exert to clean and/or remove such waste from the waste tray 108, the waste bin 174, and/or the disposable waste pan 176 when the waste management system 100 is in the closed configuration 102.

Figure 10:
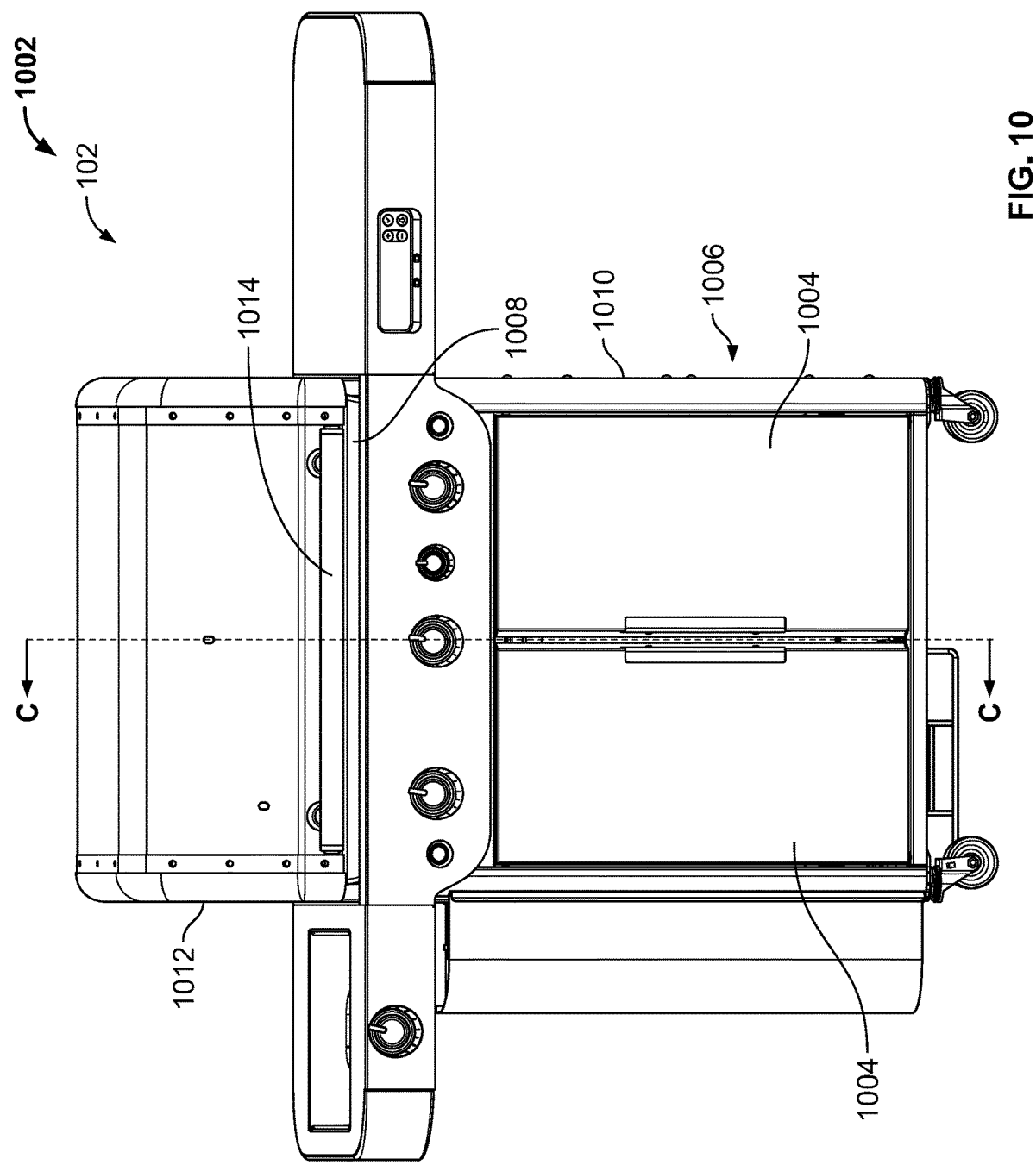
FIG. 10 is a perspective view of an example grill including the waste management system of FIGS. 1-9, with example access doors to the waste management system shown in an example closed position, and with the waste management system in the closed configuration of FIGS. 1-5.
Figure 11:
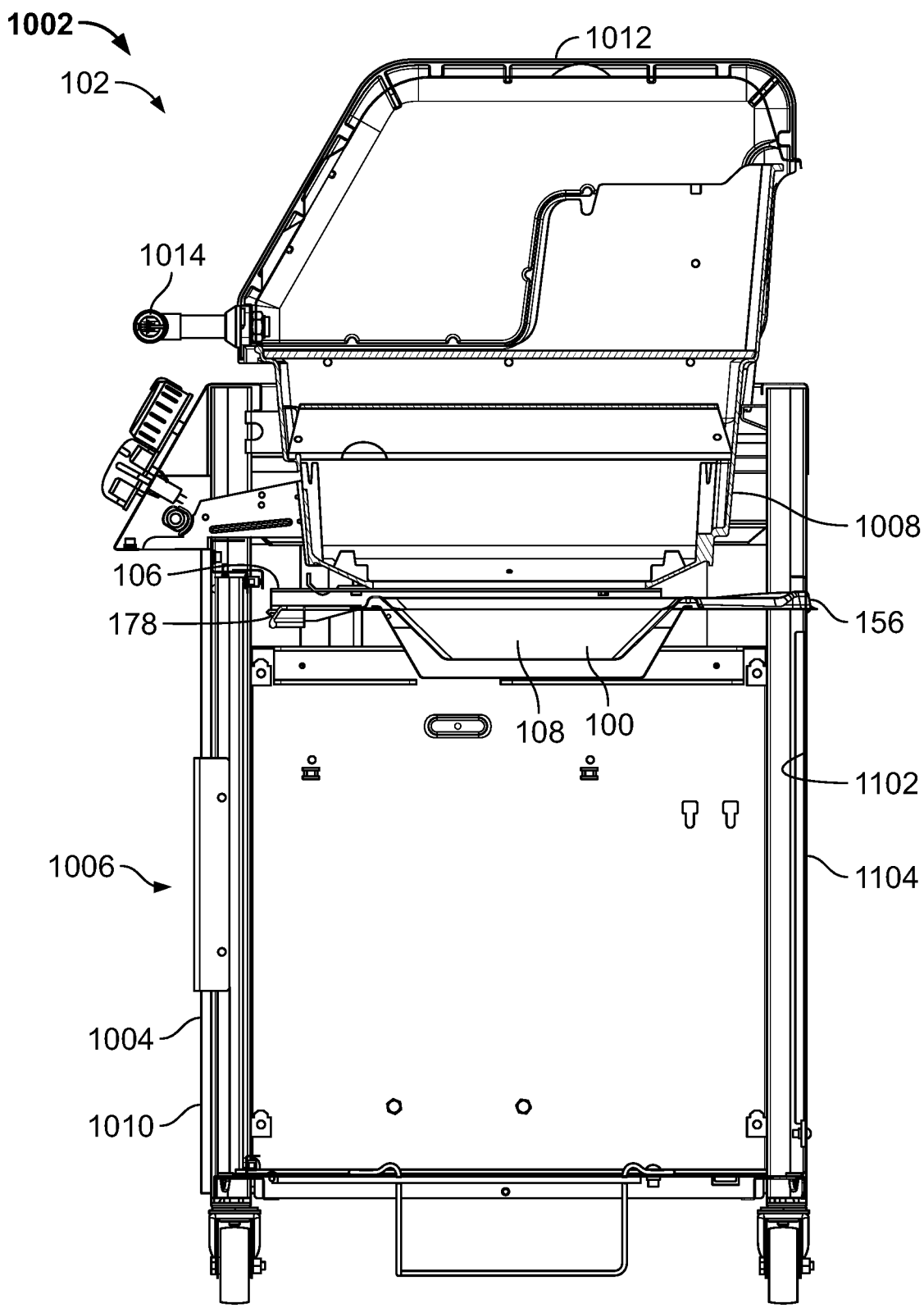
FIG. 11 is a cross-sectional view of the grill of FIG. 10 taken along section C-C of FIG. 10, with the access doors shown in the closed position of FIG. 10, and with the waste management system shown in the closed configuration of FIGS. 1-5 and 10.

FIG. 10 is a perspective view of an example grill 1002 including the waste management system 100 of FIGS. 1-9, with example access doors 1004 to the waste management system 100 shown in an example closed position 1006, and with the waste management system 100 in the closed configuration 102 of FIGS. 1-5. FIG. 11 is a cross-sectional view of the grill 1002 of FIG. 10 taken along section C-C of FIG. 10, with the access doors 1004 shown in the closed position 1006 of FIG. 10, and with the waste management system 100 shown in the closed configuration 102 of FIGS. 1-5 and 10. The grill 1002 of FIGS. 10 and 11 includes the waste management system 100, an example cookbox 1008, an example base 1010, and an example lid 1012. The cookbox 1008 of the grill 1002 is coupled to, positioned on, and/or supported by the base 1010 of the grill 1002. The base 1010 can be structured as a cart, a storage compartment, a frame, and/or any number of legs that may be suitable to support the cookbox 1008. In the illustrated example of FIGS. 10 and 11, the access doors 1004 extend across the front of the base 1010 so as to cover and/or conceal the interior of the base 1010 when the access doors 1004 are in the closed position 1006 shown in FIGS. 10 and 11. In other examples, the base 1010 of the grill 1002 can instead lack the access doors 1004. In such other examples, the base 1010 of the grill 1002 can include a different form of a structural covering extending across the front of the base 1010, or can be without any form of a structural covering extending across the front of the base 1010.

In the illustrated example of FIGS. 10 and 11, the waste management system 100 is located within the base 1010 of the grill 1002. The handle 178 of the waste management system 100 is located rearwardly of and concealed by the access doors 1004 of the base 1010. The rear stop 150 of the first flange 146 of the waste tray 108 contacts and/or is engaged with an example interior surface 1102 of an example rear wall 1104 of the base 1010. The rear stop 156 of the second flange 152 of the waste tray 108 similarly contacts and/or is engaged with the interior surface 1102 of the rear wall 1104 of the base 1010. The aforementioned engagement between the rear stop 150 of the first flange 146 of the waste tray 108 and the interior surface 1102 of the rear wall 1104 of the base 1010, and/or between the rear stop 156 of the second flange 152 of the waste tray 108 and the interior surface 1102 of the rear wall 1104 of the base 1010 prevents the waste tray 108 from sliding off of and/or out of the first guide rail 104 and/or the second guide rail 106 in a rearward direction.

The lid 1012 of the grill 1002 is movably coupled (e.g., via one or more hinge(s) or pin(s)) to the cookbox 1008 of the grill 1002 in a manner that enables the lid 1012 to be moved (e.g., pivoted and/or rotated) relative to the cookbox 1008 between a closed position (e.g., as shown in FIGS. 10 and 11) and an open position. The cookbox 1008 and the lid 1012 collectively define a cooking chamber of the grill 1002 when the lid 1012 is in the closed position. Placement of the lid 1012 in the open position enables a user to access the cookbox 1008 and/or the cooking chamber of the grill 1002, as may be required to load, unload, and/or otherwise access a food item located therein or thereon. Movement of the lid 1012 between the closed position and the open position can be performed by a user of the grill 1002 via an example handle 1018 coupled to the lid 1012.

The cookbox 1008 of the grill 1002 can house, carry, and/or otherwise include a heat-generating and/or heat-emitting structure positioned within the cookbox 1008. For example, in instances where the grill 1002 is a gas grill, the cookbox 1008 of the grill 1002 can house, carry, and/or otherwise include one or more burner tube(s) configured to generate and/or emit a heat-producing gas flame. As another example, in instances where the grill 1002 is a solid-fuel grill (e.g., a charcoal grill, a pellet grill, etc.), the cookbox 1008 of the grill 1002 can house, carry, and/or otherwise include a burn pot and/or a burn pit configured to generate and/or emit heat from charcoal and/or wood pellets being combusted thereon or therein. In some examples, the cookbox 1008 of the grill 1002 can further include one or more grease deflection bar(s) located and/or positioned within the cookbox 1008 above the aforementioned heat-generating and/or heat-emitting structure(s) of the cookbox 1008. In some examples, the cookbox 1008 of the grill 1002 can further include one or more cooking grate(s) located and/or positioned within the cookbox 1008 above the aforementioned heat-generating and/or heat-emitting structure(s) of the cookbox 1008, and/or above the aforementioned grease deflection bars of the cookbox 1008.

Figure 12:
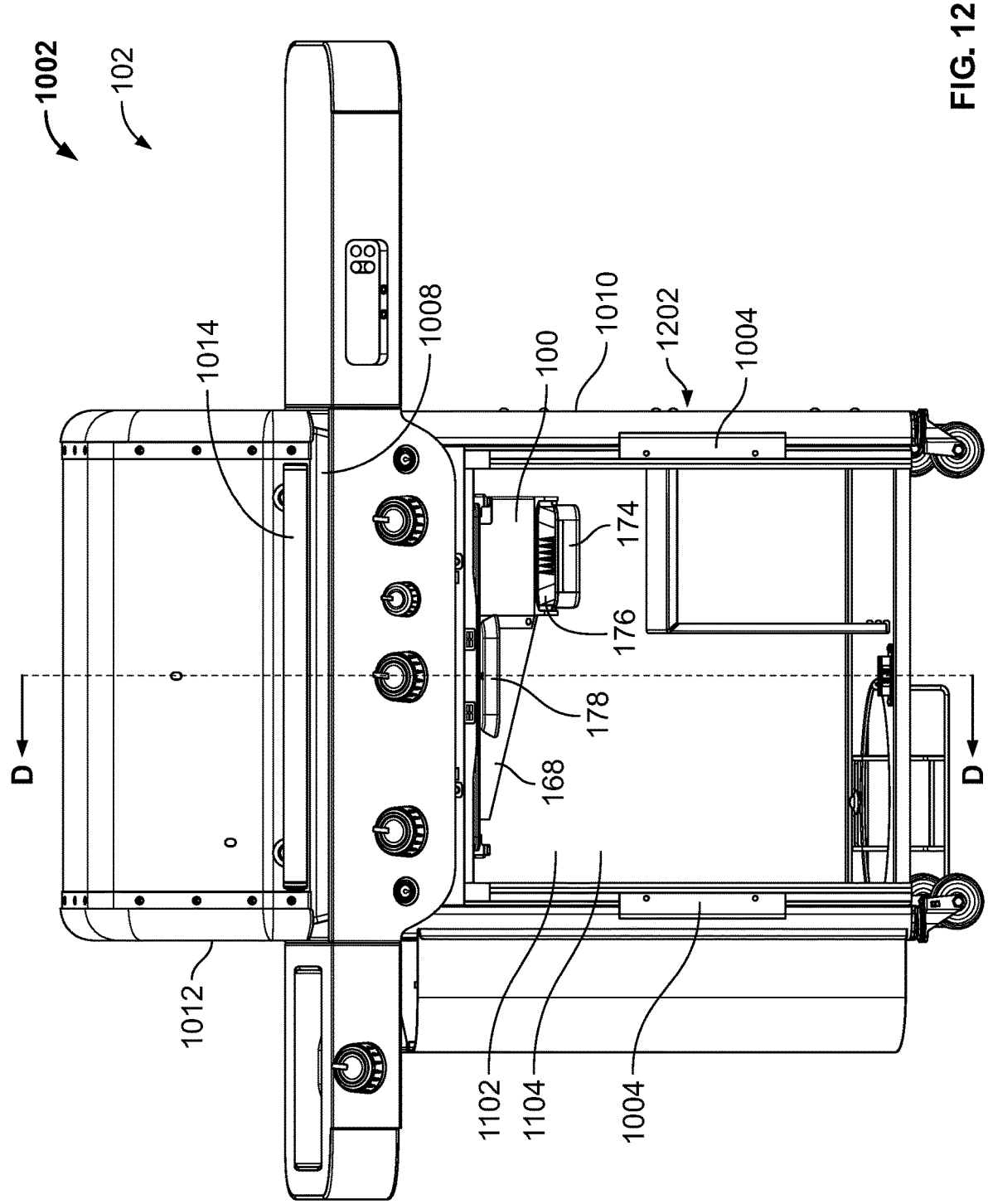
FIG. 12 is a perspective view of the grill of FIGS. 10 and 11, with the access doors shown in an example open position, and with the waste management system shown in the closed configuration of FIGS. 1-5, 10, and 11.
Figure 13:
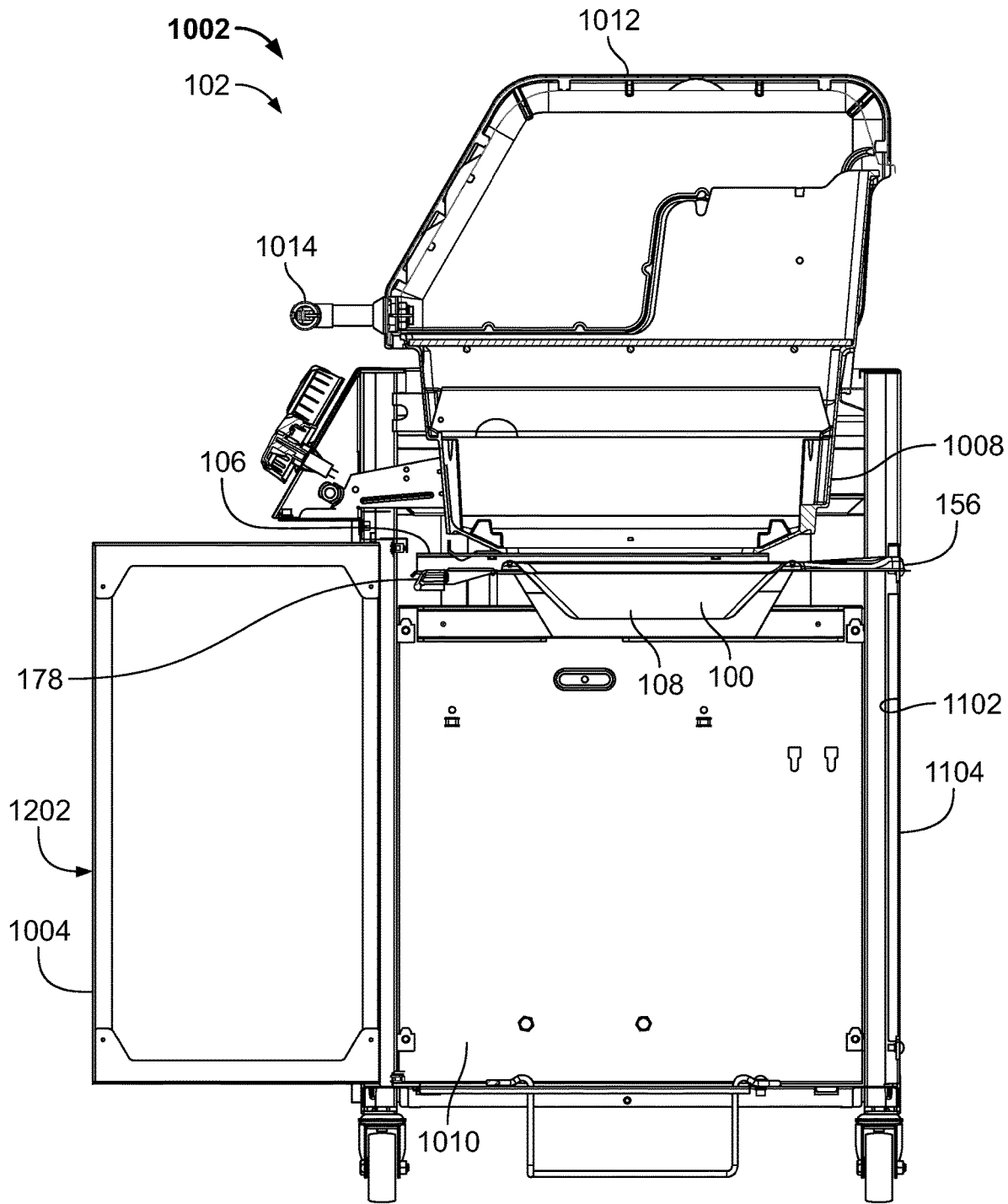
FIG. 13 is a cross-sectional view of the grill of FIGS. 10-12 taken along section D-D of FIG. 12, with the access doors shown in the open position of FIG. 12, and with the waste management system shown in the closed configuration of FIGS. 1-5 and 10-12.

FIG. 12 is a perspective view of the grill 1002 of FIGS. 10 and 11, with the access doors 1004 shown in an example open position 1202, and with the waste management system 100 shown in the closed configuration 102 of FIGS. 1-5, 10 and 11. FIG. 13 is a cross-sectional view of the grill 1002 of FIGS. 10-12 taken along section D-D of FIG. 12, with the access doors 1004 shown in the open position 1202 of FIG. 12, and with the waste management system 100 shown in the closed configuration 102 of FIGS. 1-5 and 10-12.

In the illustrated example of FIGS. 12 and 13, the waste management system 100 is located within the base 1010 of the grill 1002. The handle 178 of the waste management system 100 is located rearwardly of the access doors 1004 of the base 1010, with the handle 178 being accessible to a user of the grill 1002 by virtue of the access doors 1004 being in the open position 1202. The rear stop 150 of the first flange 146 of the waste tray 108 contacts and/or is engaged with the interior surface 1102 of the rear wall 1104 of the base 1010. The rear stop 156 of the second flange 152 of the waste tray 108 similarly contacts and/or is engaged with the interior surface 1102 of the rear wall 1104 of the base 1010. The aforementioned engagement between the rear stop 150 of the first flange 146 of the waste tray 108 and the interior surface 1102 of the rear wall 1104 of the base 1010, and/or between the rear stop 156 of the second flange 152 of the waste tray 108 and the interior surface 1102 of the rear wall 1104 of the base 1010 prevents the waste tray 108 from sliding off of and/or out of the first guide rail 104 and/or the second guide rail 106 in a rearward direction.

Figure 14:
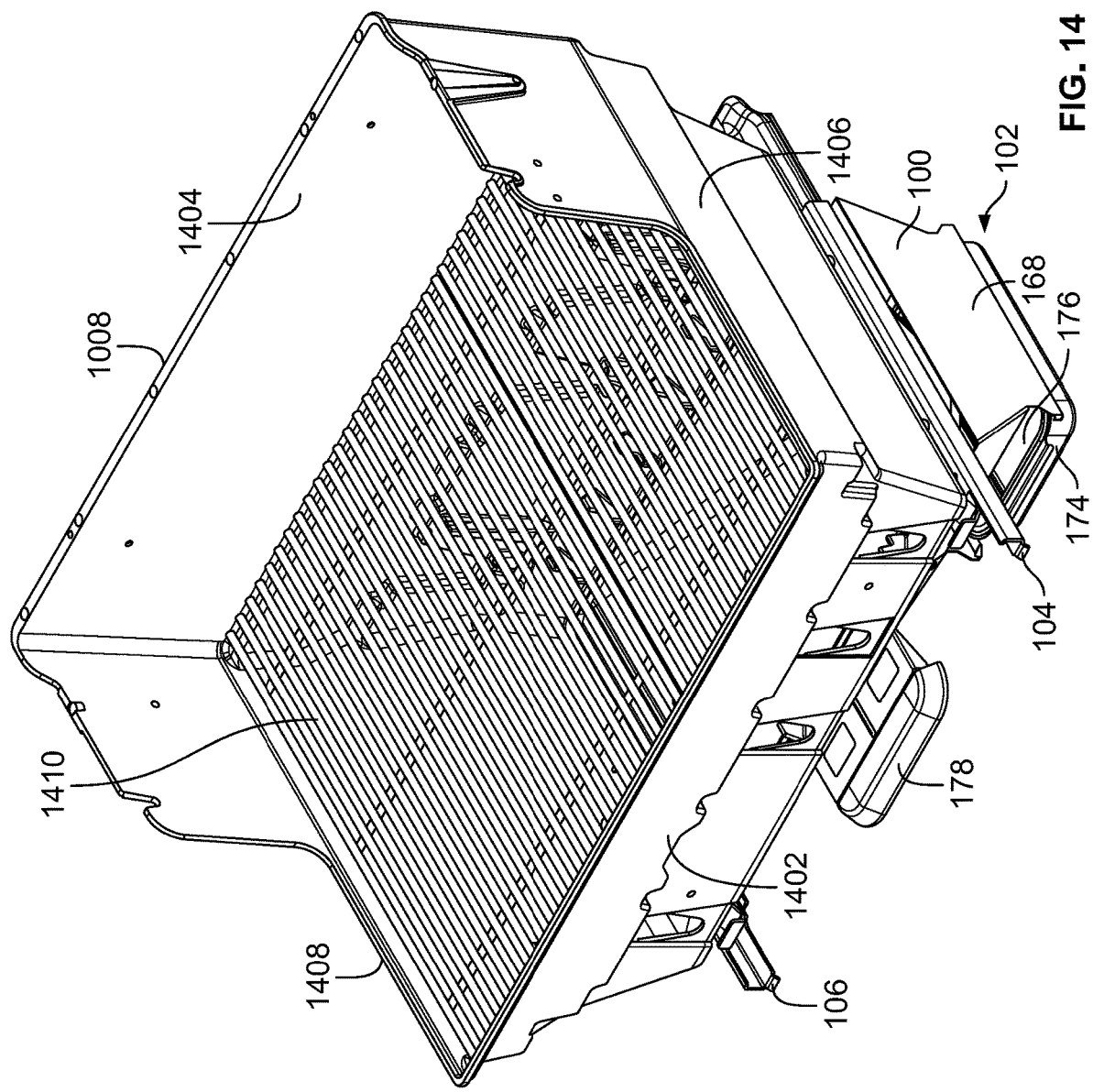
FIG. 14 is a first perspective view of the waste management system of FIGS. 1-13 coupled to the cookbox of FIGS. 10-13, with the waste management system shown positioned in the closed configuration of FIGS. 1-5 and 10-13.
Figure 15:
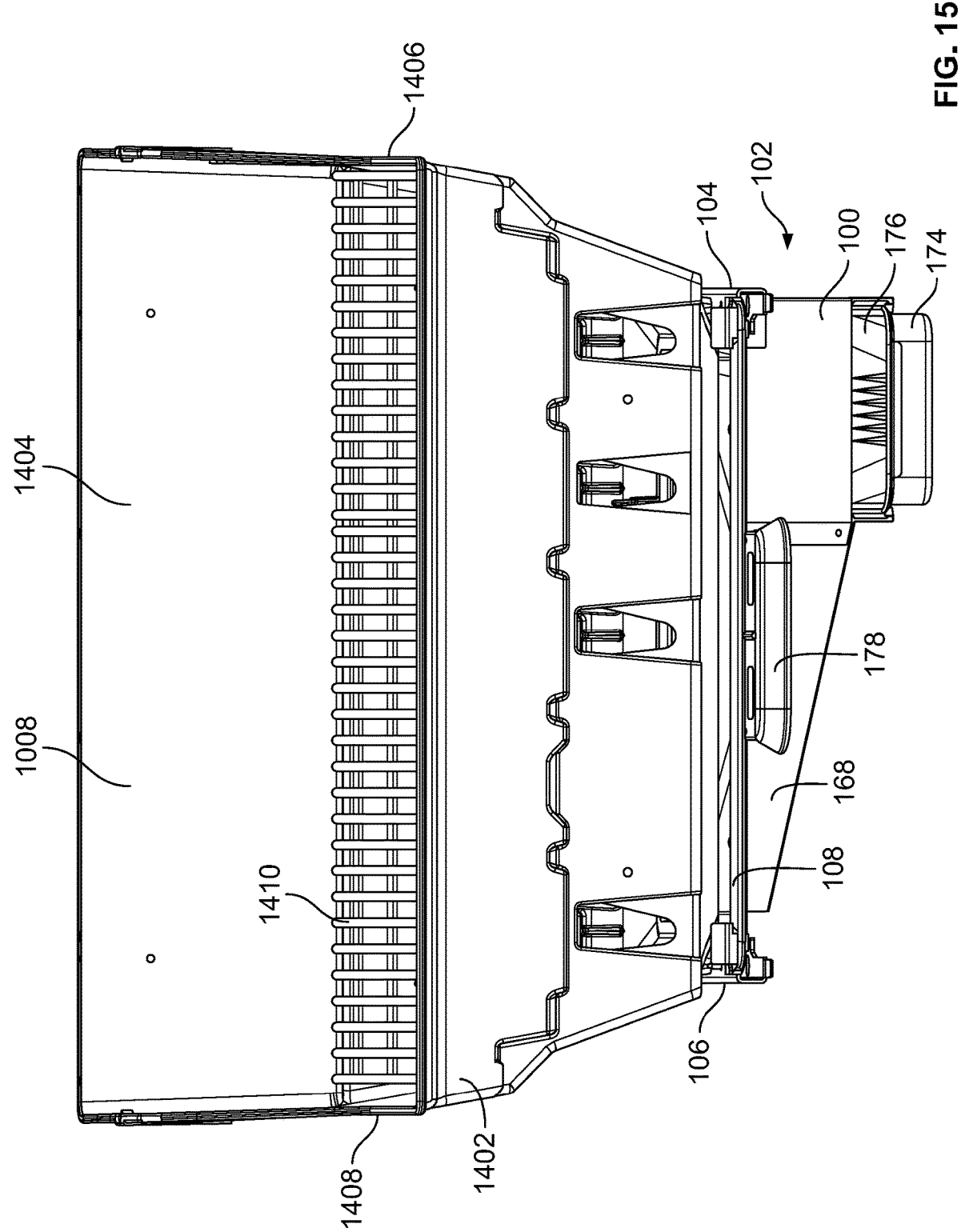
FIG. 15 is a second perspective view of the waste management system of FIGS. 1-14 coupled to the cookbox of FIGS. 10-14, with the waste management system shown positioned in the closed configuration of FIGS. 1-5 and 10-14.
Figure 16:
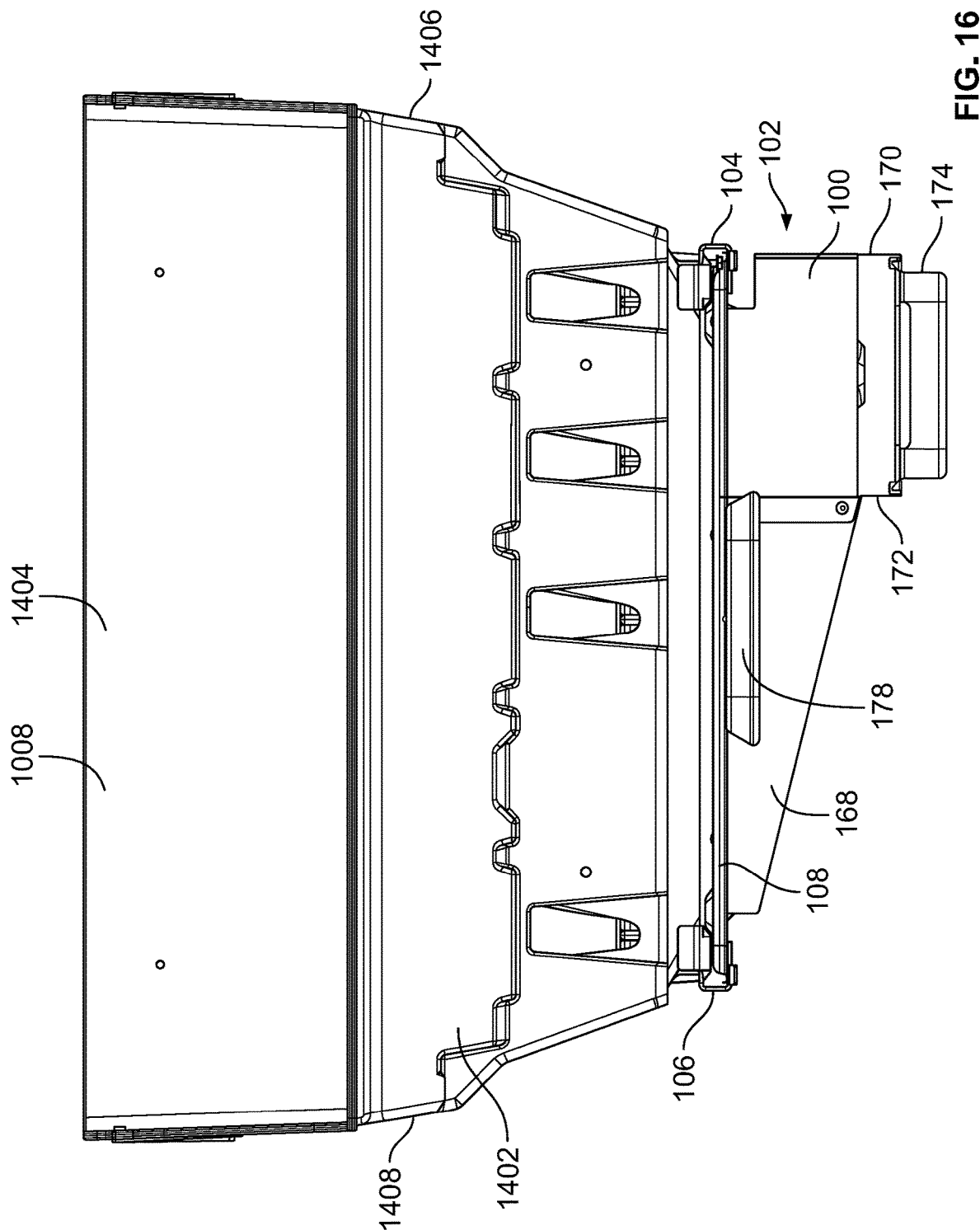
FIG. 16 is a front view of the waste management system of FIGS. 1-15 coupled to the cookbox of FIGS. 10-15, with the waste management system shown positioned in the closed configuration of FIGS. 1-5 and 10-15.
Figure 17:
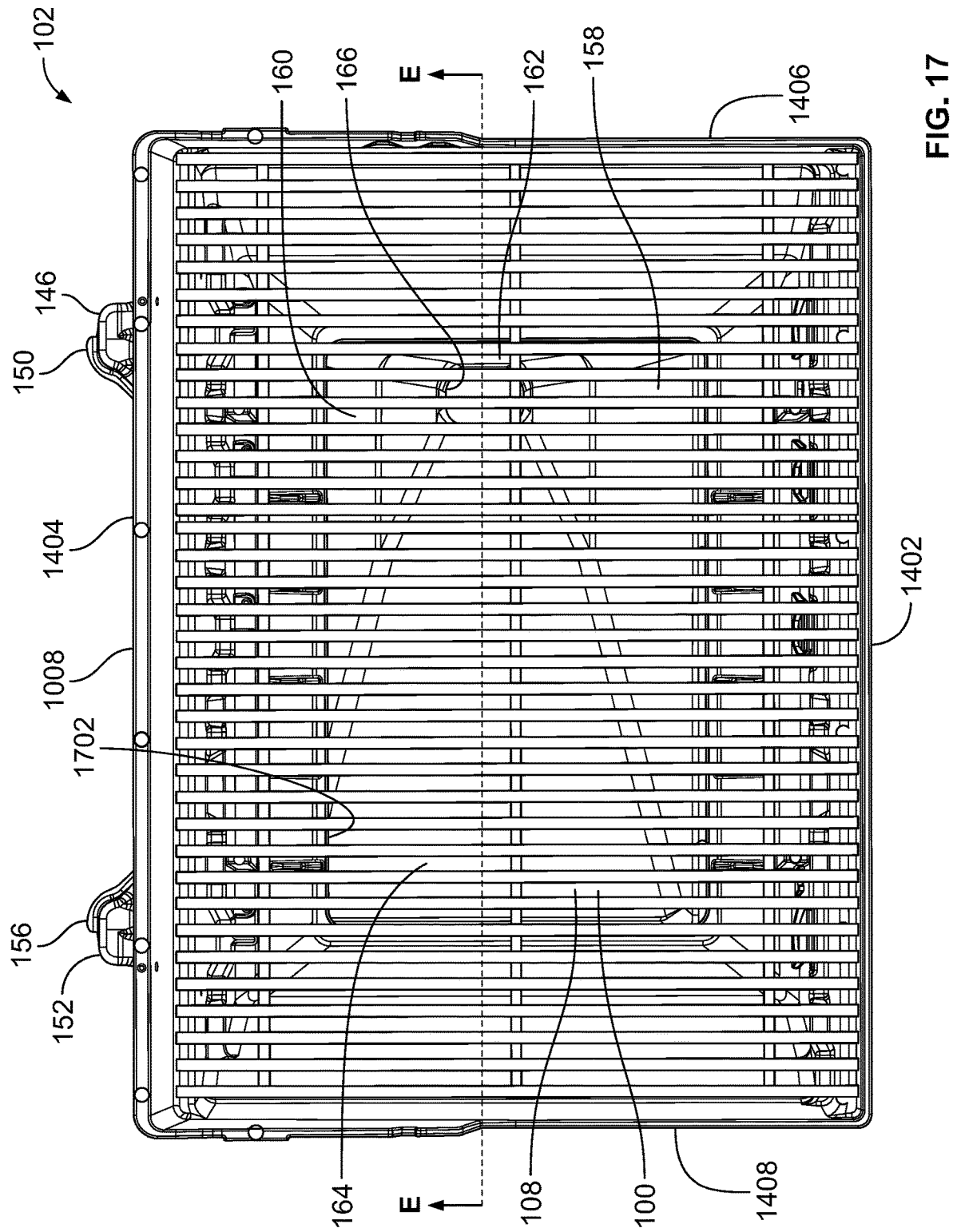
FIG. 17 is a top view of the waste management system of FIGS. 1-16 coupled to the cookbox of FIGS. 10-16, with the waste management system shown positioned in the closed configuration of FIGS. 1-5 and 10-16.
Figure 18:
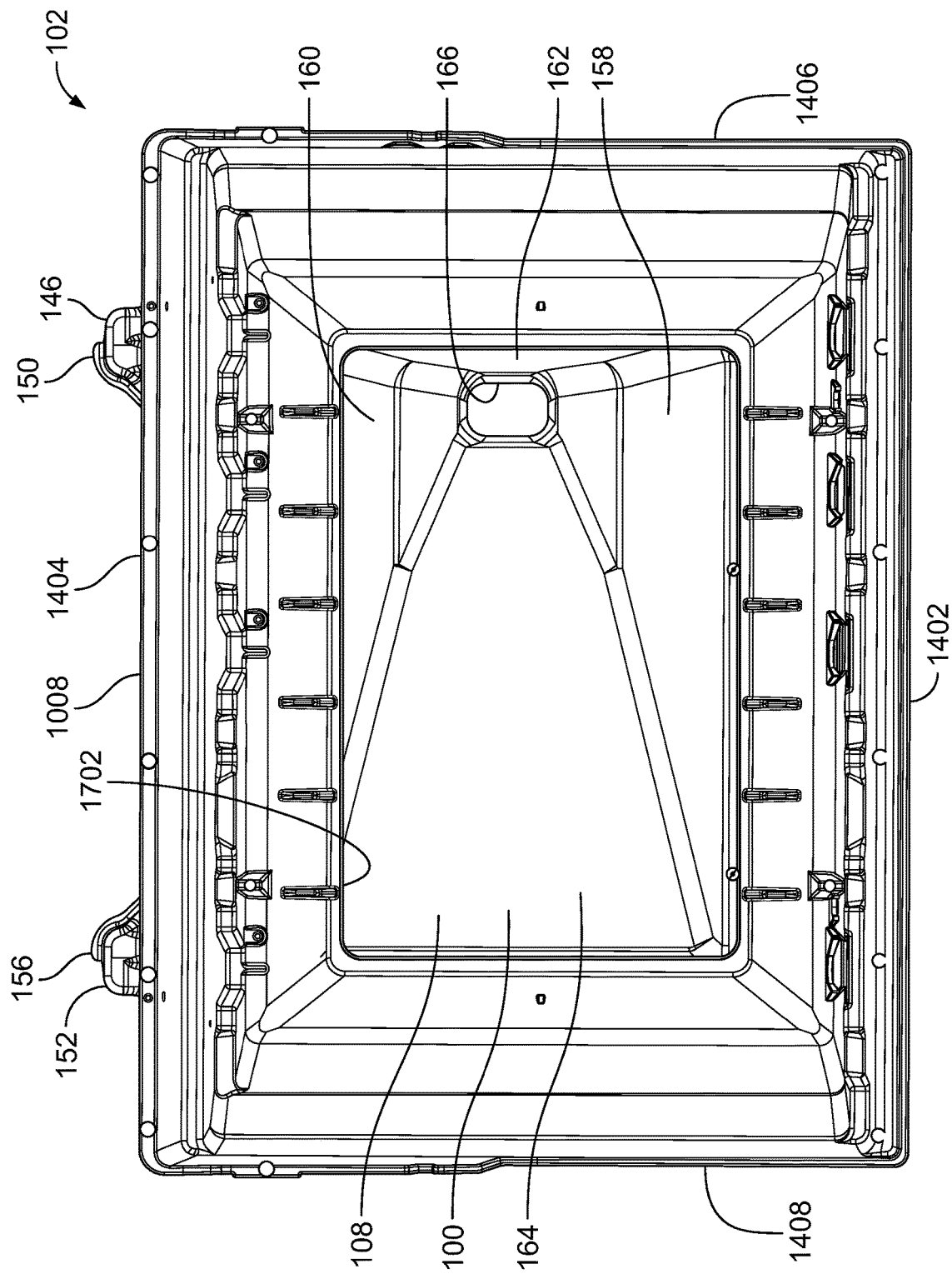
FIG. 18 is a top view of the waste management system of FIGS. 1-17 coupled to the cookbox of FIGS. 10-17, with the waste management system shown positioned in the closed configuration of FIGS. 1-5 and 10-17, and with the cooking grate(s) of the cookbox removed.
Figure 19:
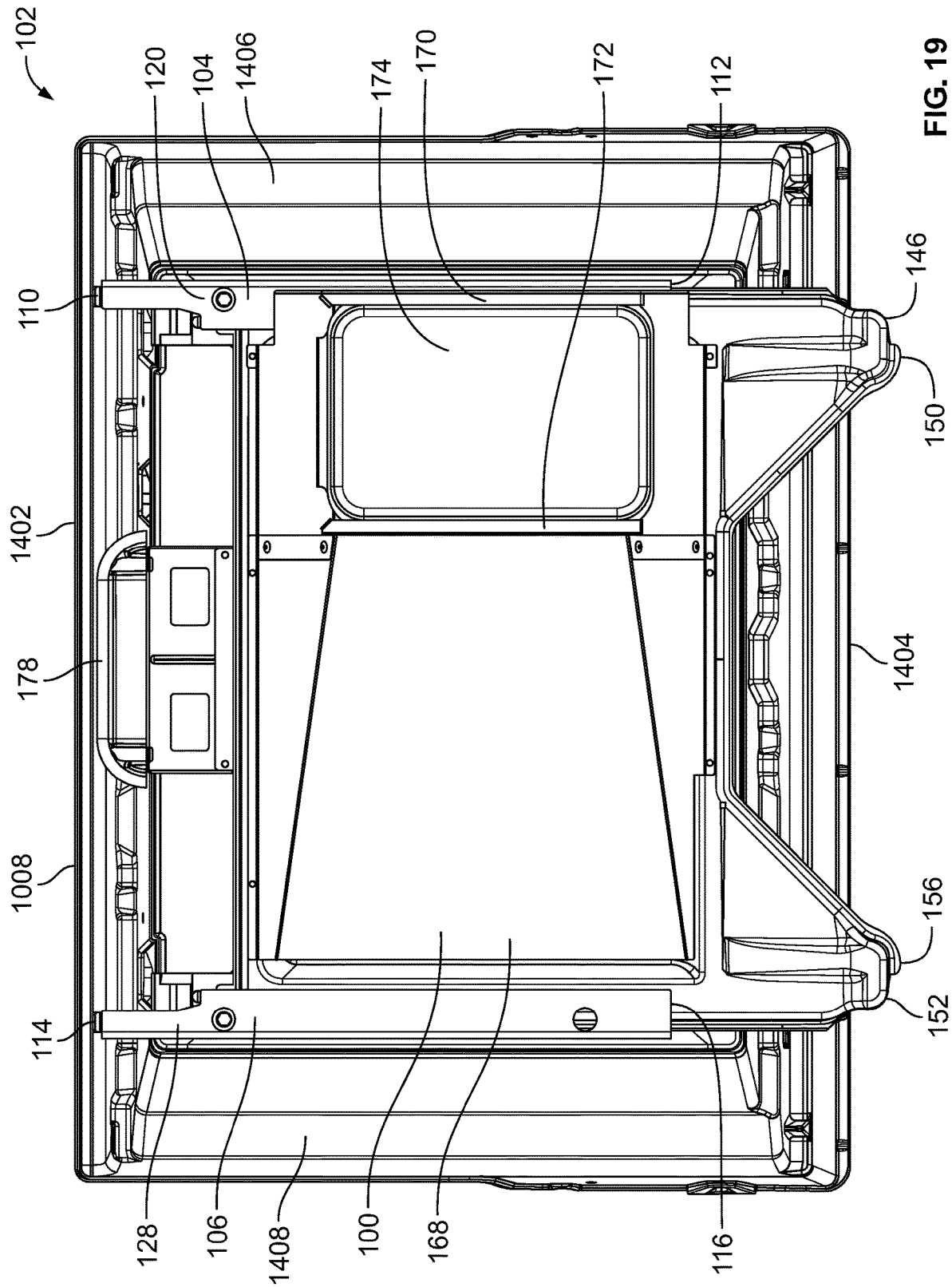
FIG. 19 is a bottom view of the waste management system of FIGS. 1-18 coupled to the cookbox of FIGS. 10-18, with the waste management system shown positioned in the closed configuration of FIGS. 1-5 and 10-18.
Figure 20:
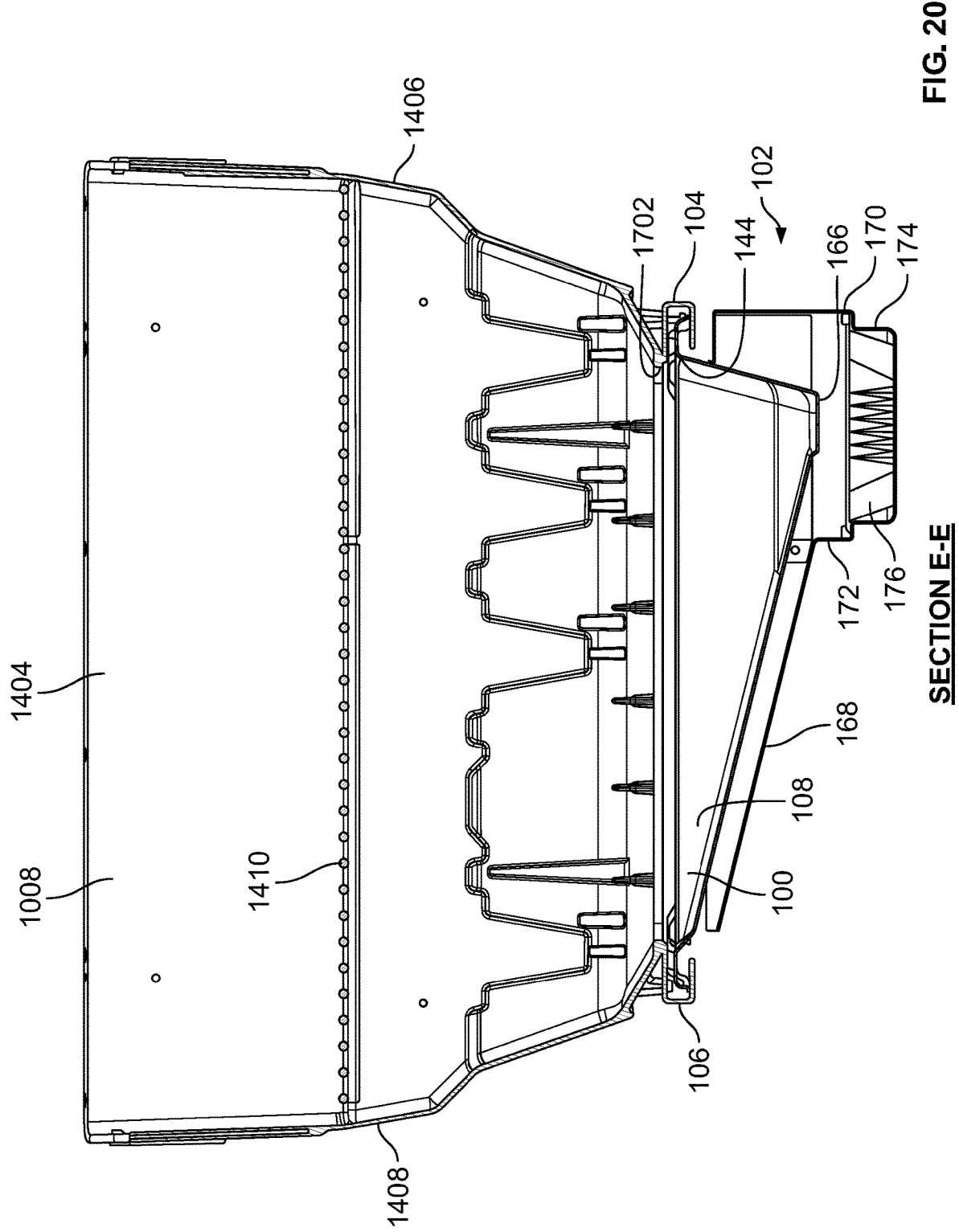
FIG. 20 is a cross-sectional view of the waste management system of FIGS. 1-19 coupled to the cookbox of FIGS. 10-19, with the waste management system shown positioned in the closed configuration of FIGS. 1-5 and 10-19.

FIG. 14 is a first perspective view of the waste management system 100 of FIGS. 1-13 coupled to the cookbox 1008 of FIGS. 10-13, with the waste management system 100 shown positioned in the closed configuration 102 of FIGS. 1-5 and 10-13. FIG. 15 is a second perspective view of the waste management system 100 of FIGS. 1-14 coupled to the cookbox 1008 of FIGS. 10-14, with the waste management system 100 shown positioned in the closed configuration 102 of FIGS. 1-5 and 11-14. FIG. 16 is a front view of the waste management system 100 of FIGS. 1-15 coupled to the cookbox 1008 of FIGS. 10-15, with the waste management system 100 shown positioned in the closed configuration 102 of FIGS. 1-5 and 10-15. FIG. 17 is a top view of the waste management system 100 of FIGS. 1-16 coupled to the cookbox 1008 of FIGS. 10-16, with the waste management system 100 shown positioned in the closed configuration 102 of FIGS. 1-5 and 10-16. FIG. 18 is a top view of the waste management system 100 of FIGS. 1-17 coupled to the cookbox 1008 of FIGS. 10-17, with the waste management system 100 shown positioned in the closed configuration 102 of FIGS. 1-5 and 10-17, and with the cooking grate(s) of the cookbox 1008 removed. FIG. 19 is a bottom view of the waste management system 100 of FIGS. 1-18 coupled to the cookbox 1008 of FIGS. 10-18, with the waste management system 100 shown positioned in the closed configuration 102 of FIGS. 1-5 and 10-18. FIG. 20 is a cross-sectional view of the waste management system 100 of FIGS. 1-19 coupled to the cookbox 1008 of FIGS. 10-19, with the waste management system 100 shown positioned in the closed configuration 102 of FIGS. 1-5 and 10-19.

In the illustrated example of FIGS. 14-20, the cookbox 1008 includes an example front wall 1402, an example rear wall 1404 spaced apart from the front wall 1402, an example right sidewall 1406 extending between the front wall 1402 and the rear wall 1404, and an example left sidewall 1408 spaced apart from the right sidewall 1406 and extending between the front wall 1402 and the rear wall 1404. Lower and/or bottom ends of the front wall 1402, the rear wall 1404, the right sidewall 1406, and the left sidewall 1408 collectively define an example lower opening 1702 located between the front wall 1402, the rear wall 1404, the right sidewall 1406, and the left sidewall 1408 of the cookbox 1008, with the lower opening 1702 of the cookbox 1008 being located above the upper opening 144 of the waste tray 108.

The upper opening 144 of the waste tray 108 is configured to be larger than and/or to circumscribe the lower opening 1702 of the cookbox 1008 such that any waste (e.g., grease, ash, and/or other residual cooking matter) passing out of the cookbox 1008 via the lower opening 1702 of the cookbox 1008 passes into and/or through the upper opening 144 of the waste tray 108 when the waste management system 100 is in the closed configuration 102 shown in FIGS. 1-5 and 10-20. In the illustrated example of FIGS. 14-20, the lower opening 1702 of the cookbox 1008 has a generally rectangular profile. In other examples, the lower opening 1702 of the cookbox 1008 can instead have a non-rectangular profile (e.g., a circular profile, an elliptical profile, a trapezoidal profile, a hexagonal profile, etc.).

One or more example cooking grate(s) 1410 of the grill 1002 is/are located and/or positioned within the cookbox 1008. The cooking grate(s) 1410 is/are configured to form and/or define a substantially flat, planar cooking surface for cooking one or more food item(s) placed thereon. As shown in FIGS. 14-20, the cooking grate(s) 1410 is/are configured to fill, cover, and/or occupy the substantial entirety of the horizontal form factor and/or footprint of the cookbox 1008 (e.g., as defined by the width and the depth of the cookbox 1008). In other examples, the cooking grate(s) 1410 can instead be configured to fill, cover, and/or occupy a relatively smaller portion and/or percentage (e.g., less than the substantial entirety) of the horizontal form factor and/or footprint of the cookbox 1008.

The waste management system 100 of FIGS. 1-20 is coupled to the cookbox 1008 of FIGS. 10-20 via the first guide rail 104 and the second guide rail 106 of the waste management system 100. More specifically, the first guide rail 104 of the waste management system 100 is coupled (e.g., rigidly and/or fixedly coupled) to the bottom of the cookbox 1008 at a location to the right of the lower opening 1702 of the cookbox 1008 (e.g., at a location proximate and/or along the right sidewall 1406 of the cookbox 1008), and the second guide rail 106 of the waste management system 100 is coupled (e.g., rigidly and/or fixedly coupled) to the bottom of the cookbox 1008 at a location to the left of the lower opening 1702 of the cookbox 1008 (e.g., at a location proximate and/or along the left sidewall 1408 of the cookbox 1008). When the waste management system 100 is in the closed configuration 102 shown in FIGS. 1-5 and 10-20, the first guide rail 104, the second guide rail 106, and the waste tray 108 of the waste management system 100 are located below the cookbox 1008, and the upper opening 144 of the waste tray 108 of the waste management system 100 is located below and vertically aligned with the lower opening 1702 of the cookbox 1008.

Figure 21:
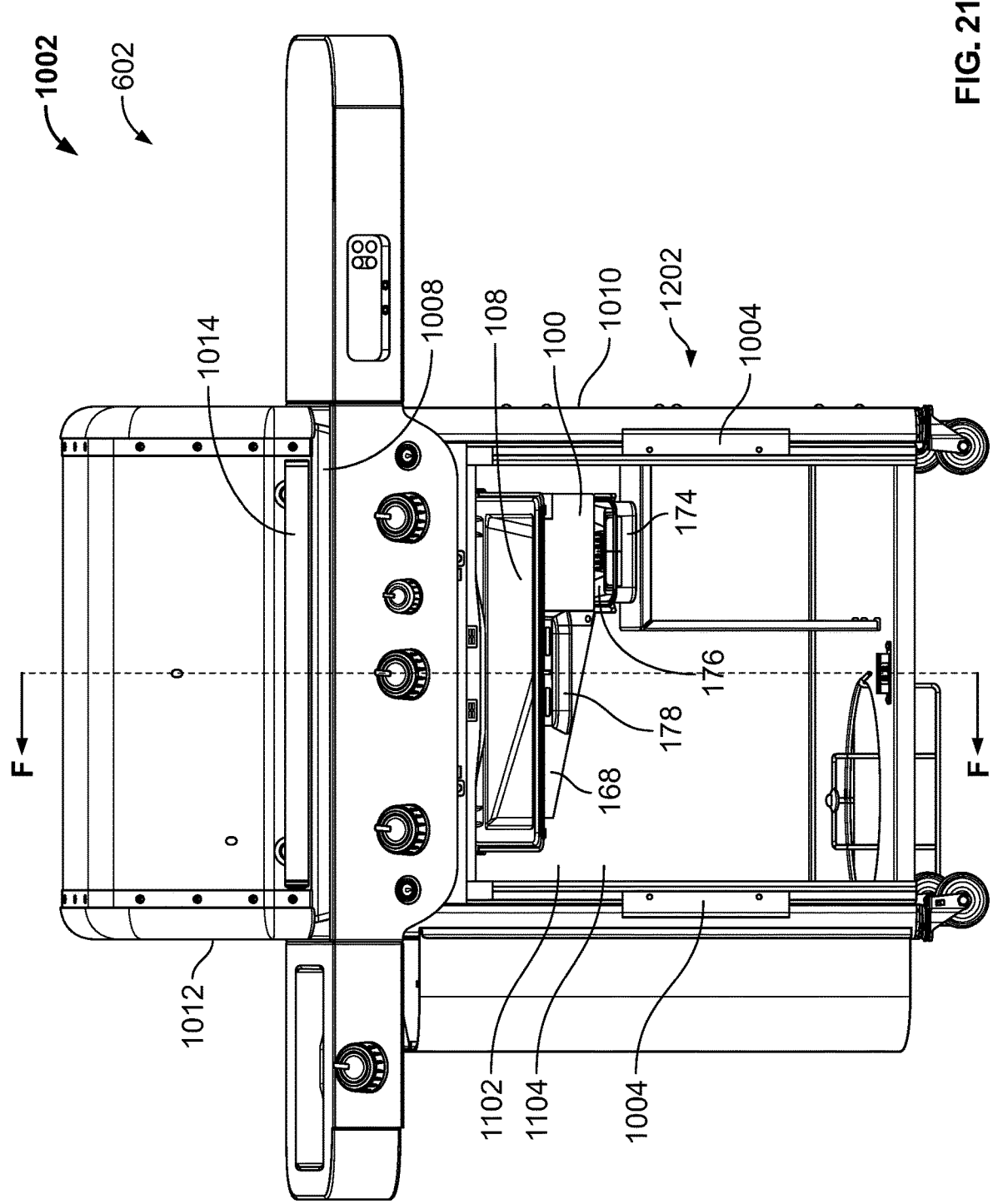
FIG. 21 is a perspective view of the grill of FIGS. 10-13, with the access doors shown in the open position of FIGS. 12 and 13, and with the waste management system shown in the open configuration of FIGS. 6-9.
Figure 22:
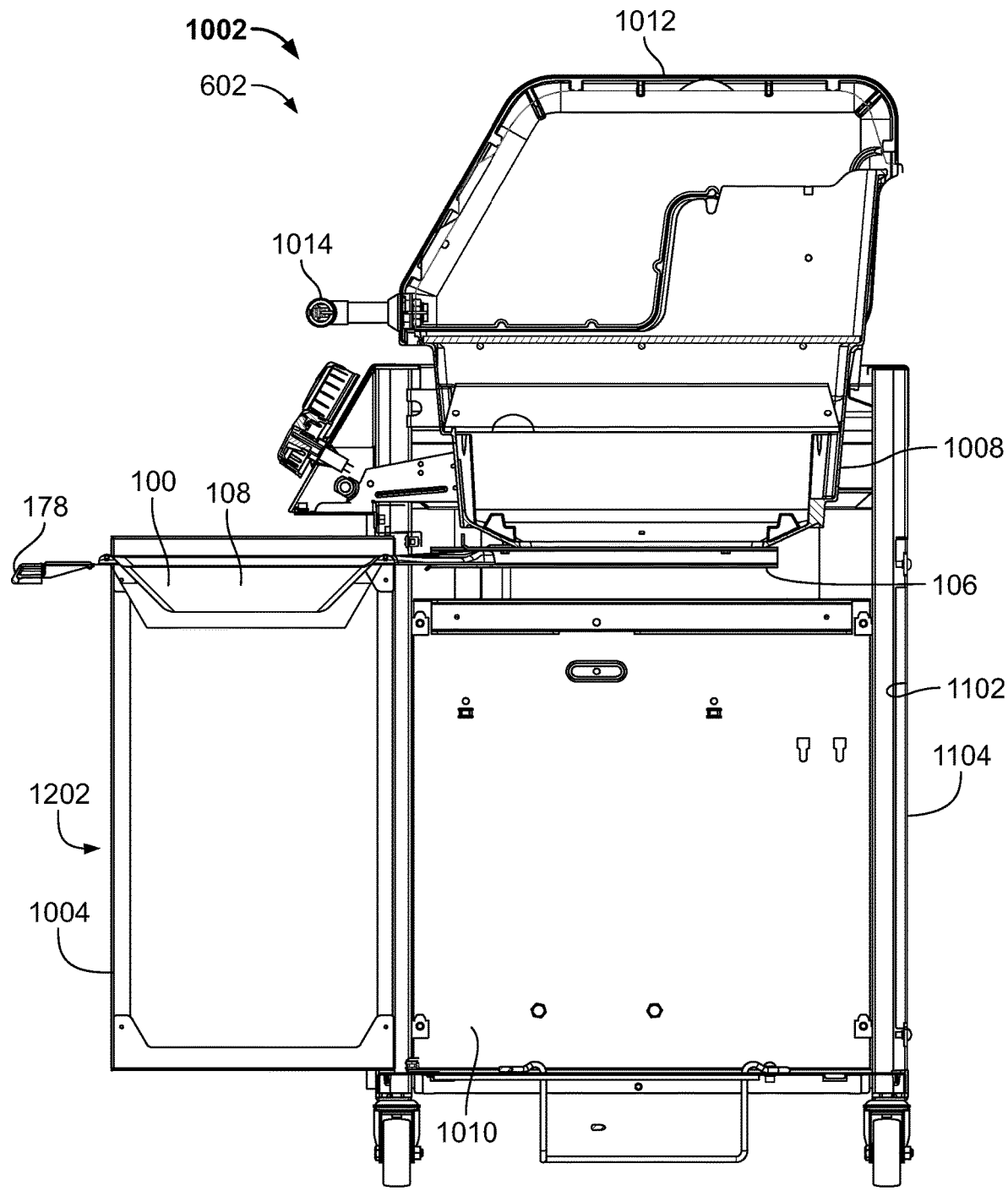
FIG. 22 is a cross-sectional view of the grill of FIGS. 10-13 and 21 taken along section F-F of FIG. 21, with the access doors shown in the open position of FIGS. 12, 13, and 21, and with the waste management system shown in the open configuration of FIGS. 6-9 and 21.

FIG. 21 is a perspective view of the grill 1002 of FIGS. 10-13, with the access doors 1004 shown in the open position 1202 of FIGS. 12 and 13, and with the waste management system 100 shown in the open configuration 602 of FIGS. 6-9. FIG. 22 is a cross-sectional view of the grill 1002 of FIGS. 10-13 and 21 taken along section F-F of FIG. 21, with the access doors 1004 shown in the open position 1202 of FIGS. 12, 13, and 21, and with the waste management system 100 shown in the open configuration 602 of FIGS. 6-9 and 21.

In the illustrated example of FIGS. 21 and 22, the first guide rail 104 and the second guide rail 106 of the waste management system 100 are located within the base 1010 of the grill 1002. A substantial majority of the waste tray 108 of the waste management system 100 is located outside of (e.g., forward of) the base 1010 of the grill 1002, as are the waste bin 174, the disposable waste pan 176, and the handle 178 of the waste management system 100. The waste tray 108, the waste bin 174, the disposable waste pan 176, and the handle 178 of the waste management system 100 are accessible to a user of the grill 1002 by virtue of the access doors 1004 being in the open position 1202, and by virtue of the waste management system 100 being in the open configuration 602 (e.g., with the waste tray 108 of the waste management system 100 being maximally forwardly extended within the first guide rail 104 and the second guide rail 106 of the waste management system 100).

In the illustrated example of FIGS. 21 and 22, the rear stop 150 of the first flange 146 of the waste tray 108 is spaced apart from the interior surface 1102 of the rear wall 1104 of the base 1010. The rear stop 156 of the second flange 152 of the waste tray 108 is similarly spaced apart from the interior surface 1102 of the rear wall 1104 of the base 1010. The stop tab 202 of the first guide rail 104 is contacted by and/or engaged with the front stop 148 of the first flange 146 of the waste tray 108. The stop tab 204 of the second guide rail 106 is contacted by and/or engaged with the front stop 154 of the second flange 152 of the waste tray 108. The aforementioned engagement between the stop tab 202 of the first guide rail 104 and the front stop 148 of the first flange 146 of the waste tray 108, and/or between the stop tab 204 of the second guide rail 106 and the front stop 154 of the second flange 152 of the waste tray 108 prevents the waste tray 108 from sliding off of and/or out of the first guide rail 104 and/or the second guide rail 106 in a forward direction.

Figure 23:
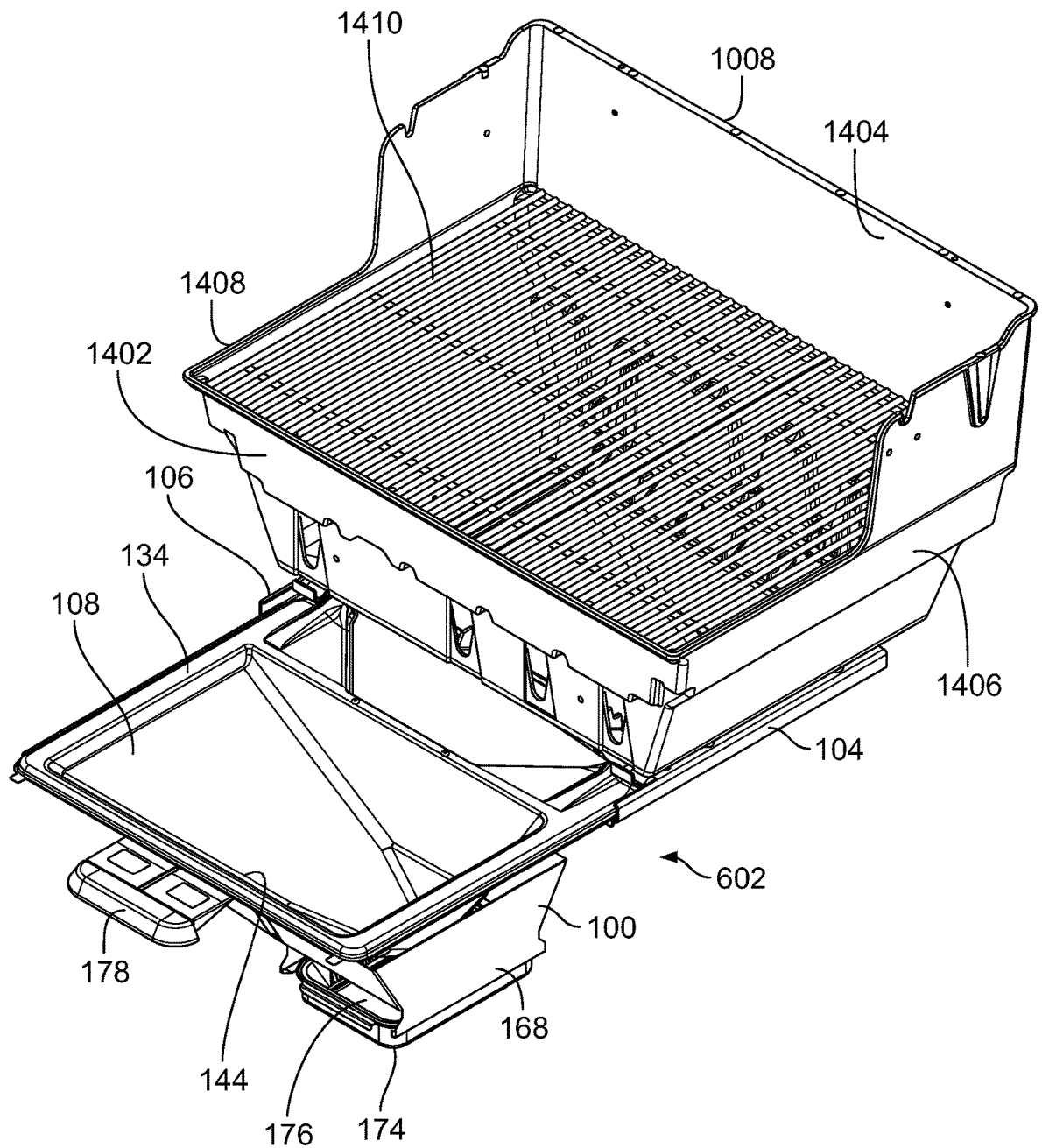
FIG. 23 is a first perspective view of the waste management system of FIGS. 1-22 coupled to the cookbox of FIGS. 10-22, with the waste management system shown positioned in the open configuration of FIGS. 6-9, 21, and 22.
Figure 24:
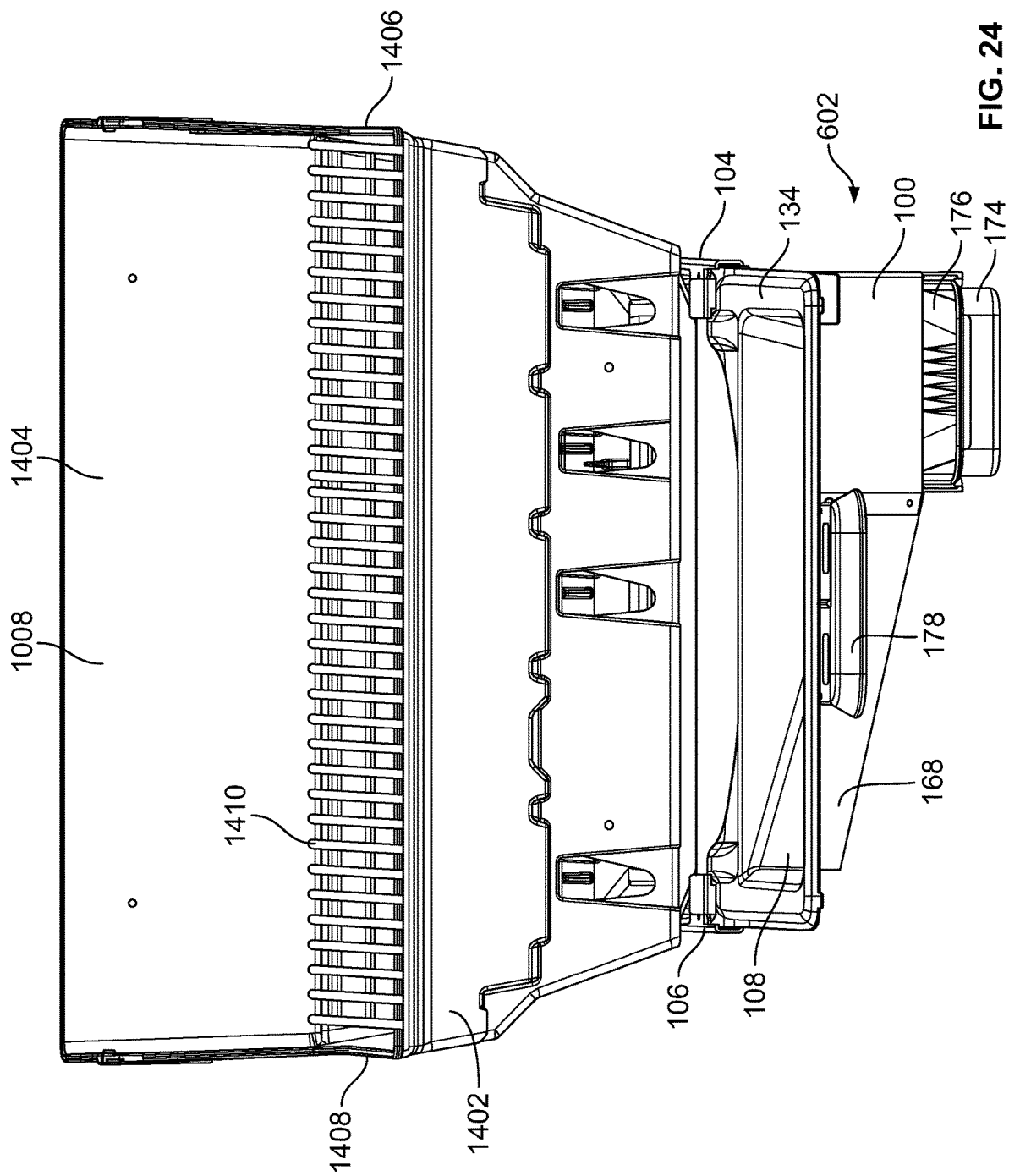
FIG. 24 is a second perspective view of the waste management system of FIGS. 1-23 coupled to the cookbox of FIGS. 10-23, with the waste management system shown positioned in the open configuration of FIGS. 6-9 and 21-23.
Figure 25:
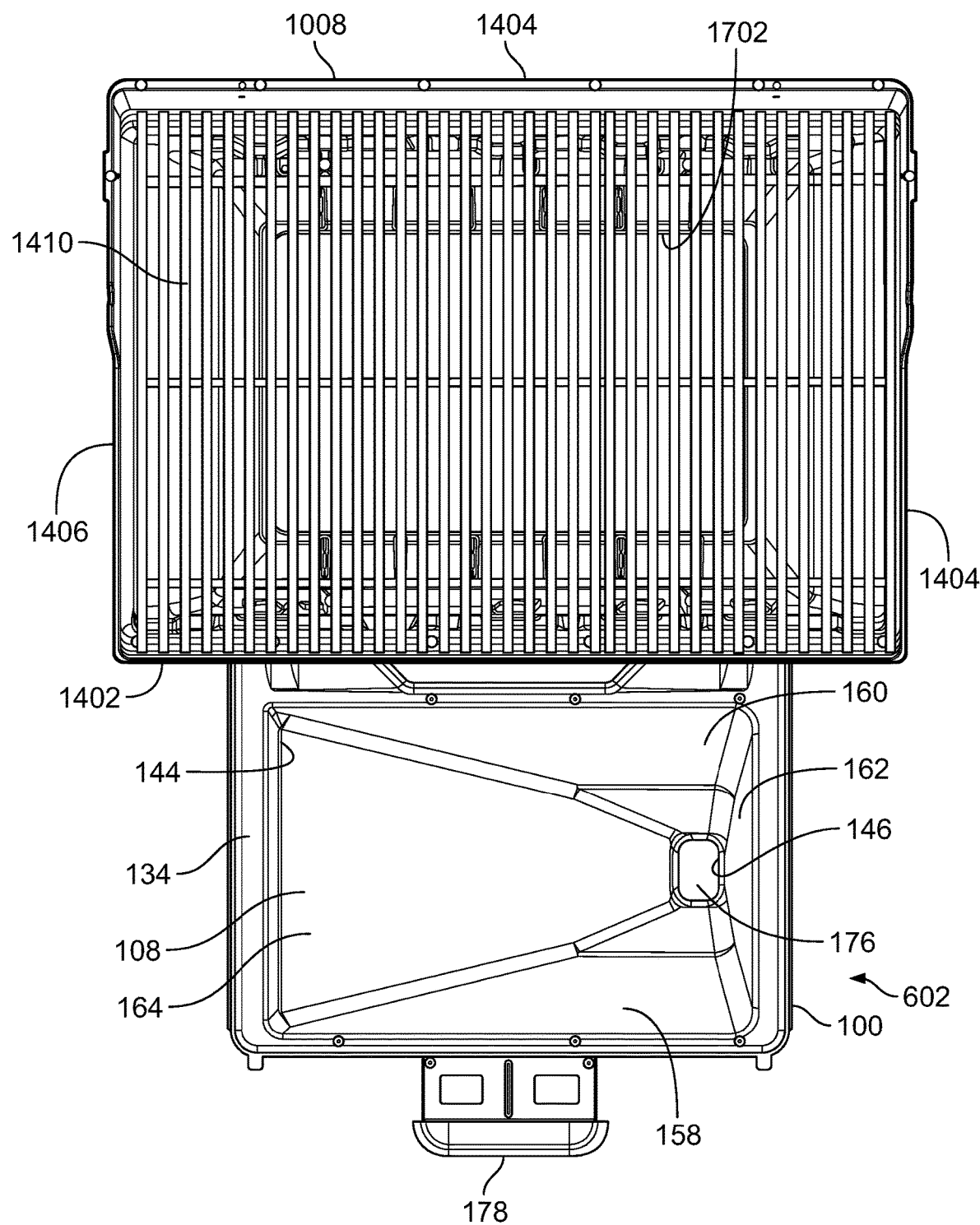
FIG. 25 is a top view of the waste management system of FIGS. 1-24 coupled to the cookbox of FIGS. 10-24, with the waste management system shown positioned in the open configuration of FIGS. 6-9 and 21-24.
Figure 26:
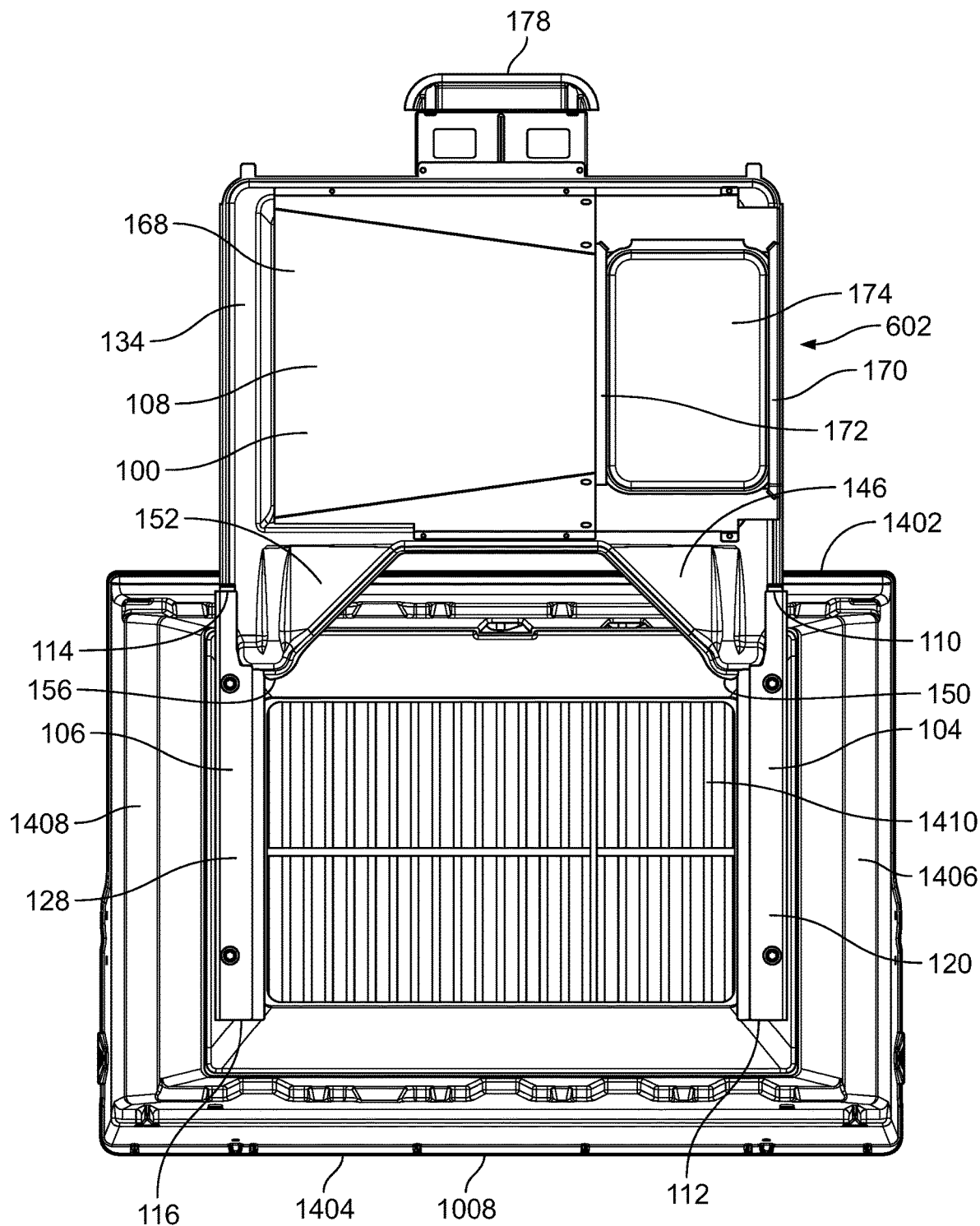
FIG. 26 is a bottom view of the waste management system of FIGS. 1-24 coupled to the cookbox of FIGS. 10-25, with the waste management system shown positioned in the open configuration of FIGS. 6-9 and 21-25.

FIG. 23 is a first perspective view of the waste management system 100 of FIGS. 1-22 coupled to the cookbox 1008 of FIGS. 10-22, with the waste management system 100 shown positioned in the open configuration 602 of FIGS. 6-9, 21, and 22. FIG. 24 is a second perspective view of the waste management system 100 of FIGS. 1-23 coupled to the cookbox 1008 of FIGS. 10-23, with the waste management system 100 shown positioned in the open configuration 602 of FIGS. 6-9 and 21-23. FIG. 25 is a top view of the waste management system 100 of FIGS. 1-24 coupled to the cookbox 1008 of FIGS. 10-24, with the waste management system 100 shown positioned in the open configuration 602 of FIGS. 6-9 and 21-24. FIG. 26 is a bottom view of the waste management system 100 of FIGS. 1-24 coupled to the cookbox 1008 of FIGS. 10-25, with the waste management system 100 shown positioned in the open configuration 602 of FIGS. 6-9 and 21-25.

When the waste management system 100 is in the open configuration 602 shown in FIGS. 6-9 and 21-26, the first guide rail 104 and the second guide rail 106 of the waste management system 100 remain located below the cookbox 1008, but the upper opening 144 of the waste tray 108 of the waste management system 100 is no longer located below and vertically aligned with the lower opening 1702 of the cookbox 1008. Instead, the upper opening 144 of the waste tray 108 of the waste management system 100 is located forward of the lower opening 1702 of the cookbox 1008 and/or, more generally, forward of the cookbox 1008 and/or the base 1010 of the grill 1002.

A user of a grill including the waste management system 100 of FIGS. 1-26 (e.g., the grill 1002 of FIGS. 10-13 and 21-22) can transition the waste management system 100 from the closed configuration 102 shown in FIGS. 1-5 and 10-20 into the open configuration 602 shown in FIGS. 6-9 and 21-26 by pulling the handle 178 of the waste management system 100 in a forward direction. Conversely, the user can transition the waste management system 100 of FIGS. 1-20 from the open configuration 602 shown in FIGS. 6-9 and 21-26 into the closed configuration 102 shown in FIGS. 1-5 and 10-20 by pushing the handle 178 of the waste management system 100 in a rearward direction. Transitioning the waste management system 100 from the closed configuration 102 shown in FIGS. 1-5 and 10-20 into the open configuration 602 shown in FIGS. 6-9 and 21-26 advantageously enables the user to more easily clean and/or remove waste (e.g., grease, ash, and/or other residual cooking matter) from the waste tray 108, the waste bin 174, and/or the disposable waste pan 176 relative to the effort which the user would otherwise exert to clean and/or remove such waste from the waste tray 108, the waste bin 174, and/or the disposable waste pan 176 when the waste management system 100 is in the closed configuration 102, and/or in the absence of the waste management system 100.

Figure 27:
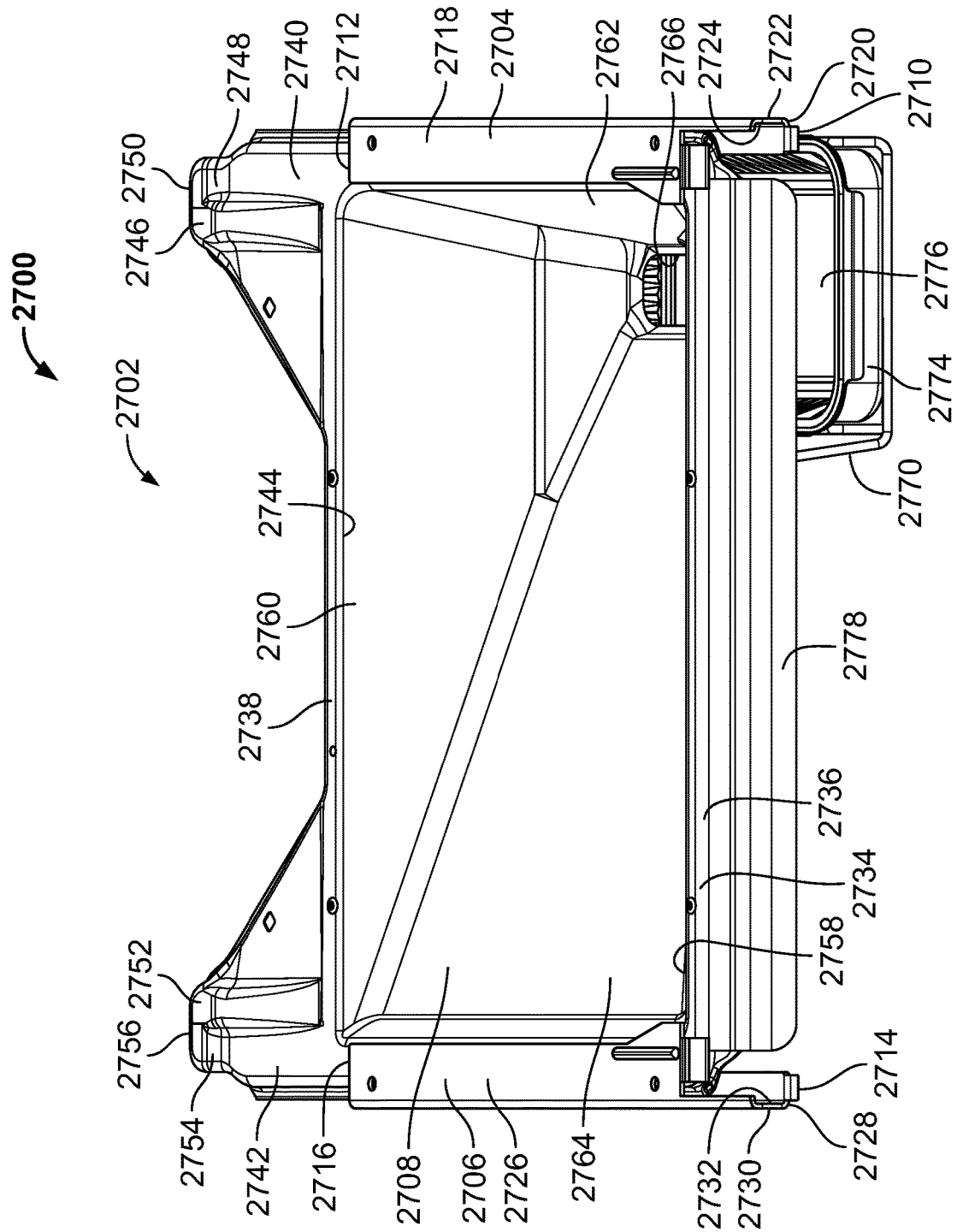
FIG. 27 is a perspective view of another example waste management system constructed in accordance with teachings of this disclosure, with the waste management system shown positioned in an example closed configuration.
Figure 28:
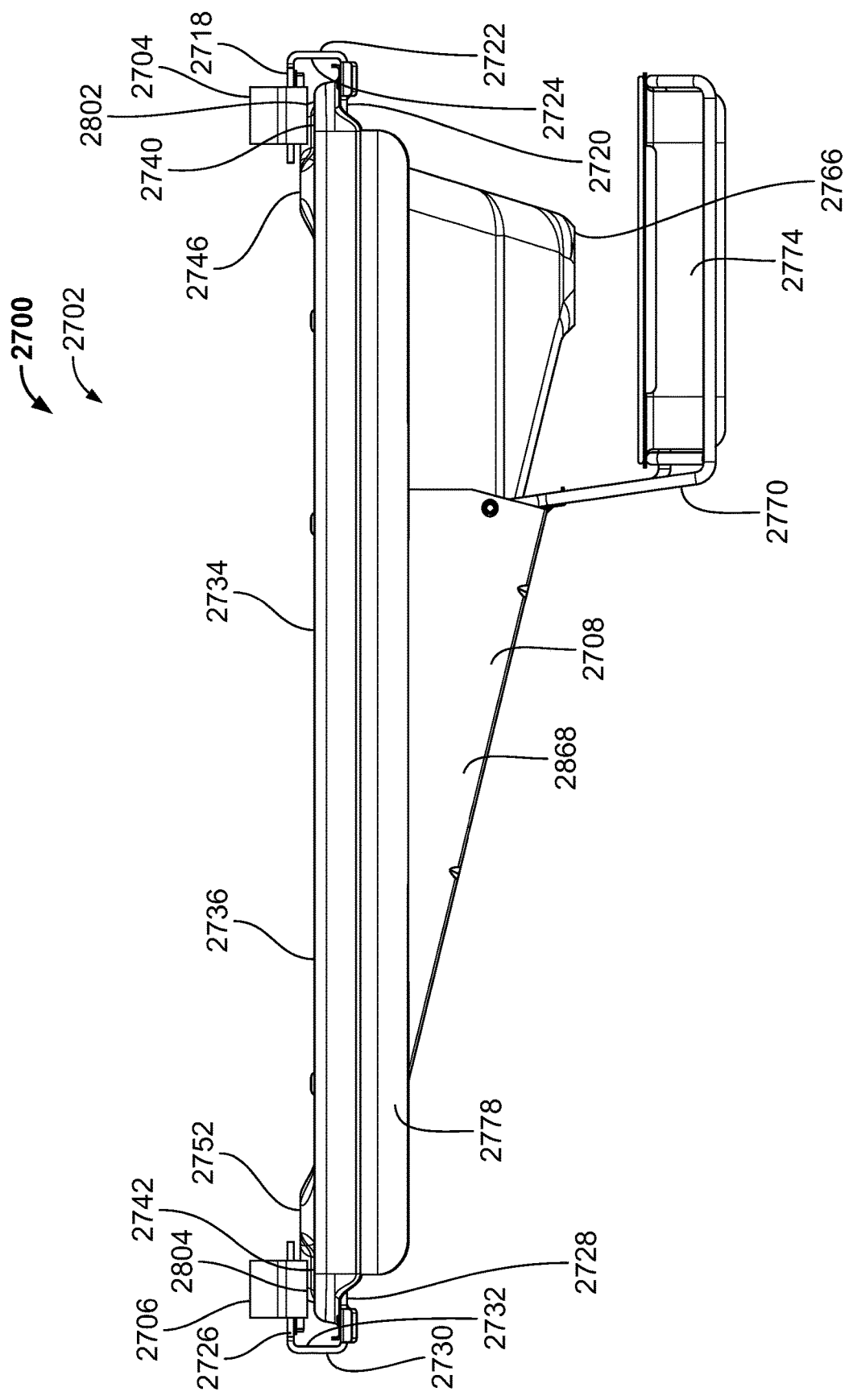
FIG. 28 is a front view of the waste management system of FIG. 27, with the waste management system shown positioned in the closed configuration of FIG. 27.
Figure 29:
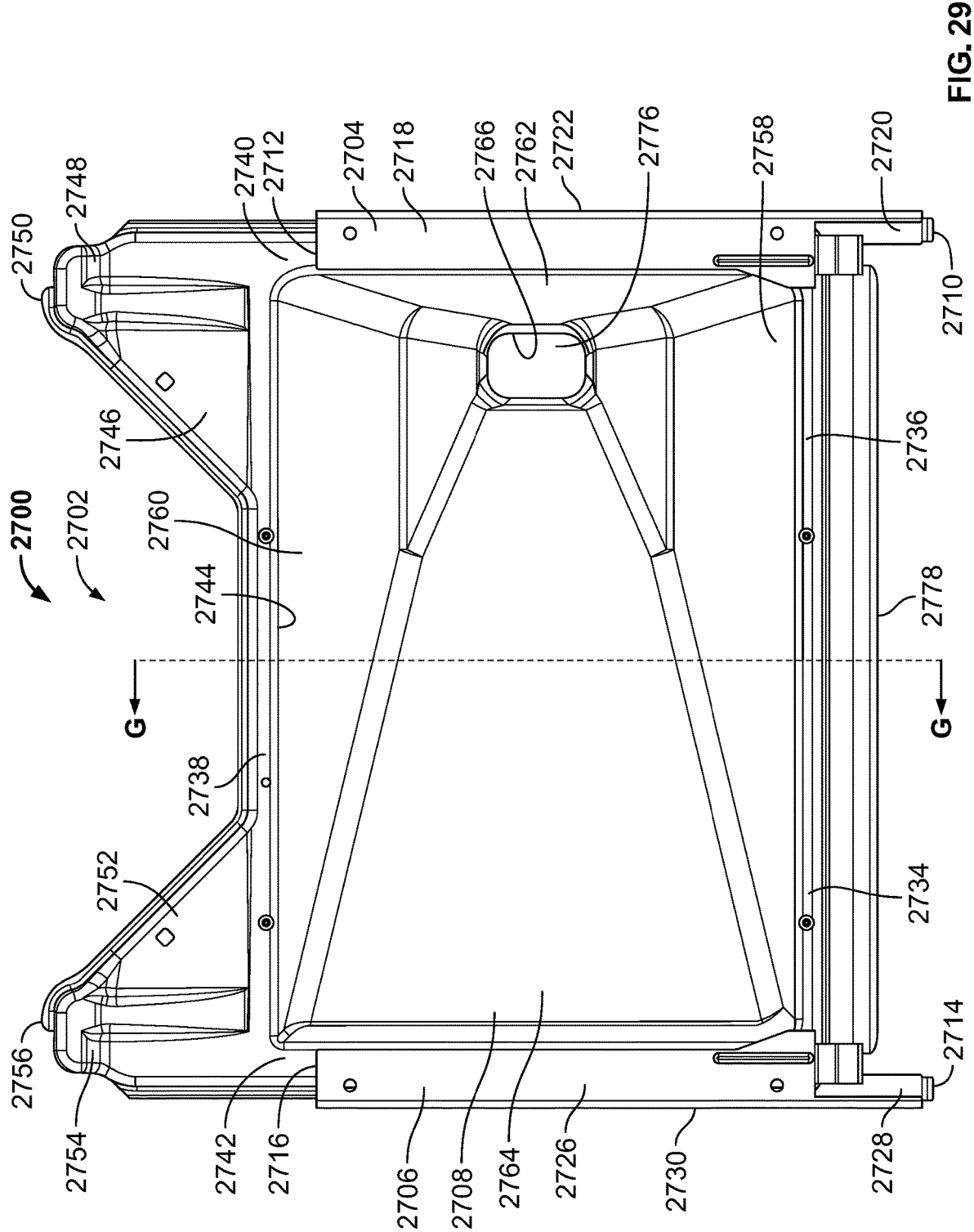
FIG. 29 is a top view of the waste management system of FIGS. 27 and 28, with the waste management system shown positioned in the closed configuration of FIGS. 27 and 28.
Figure 30:
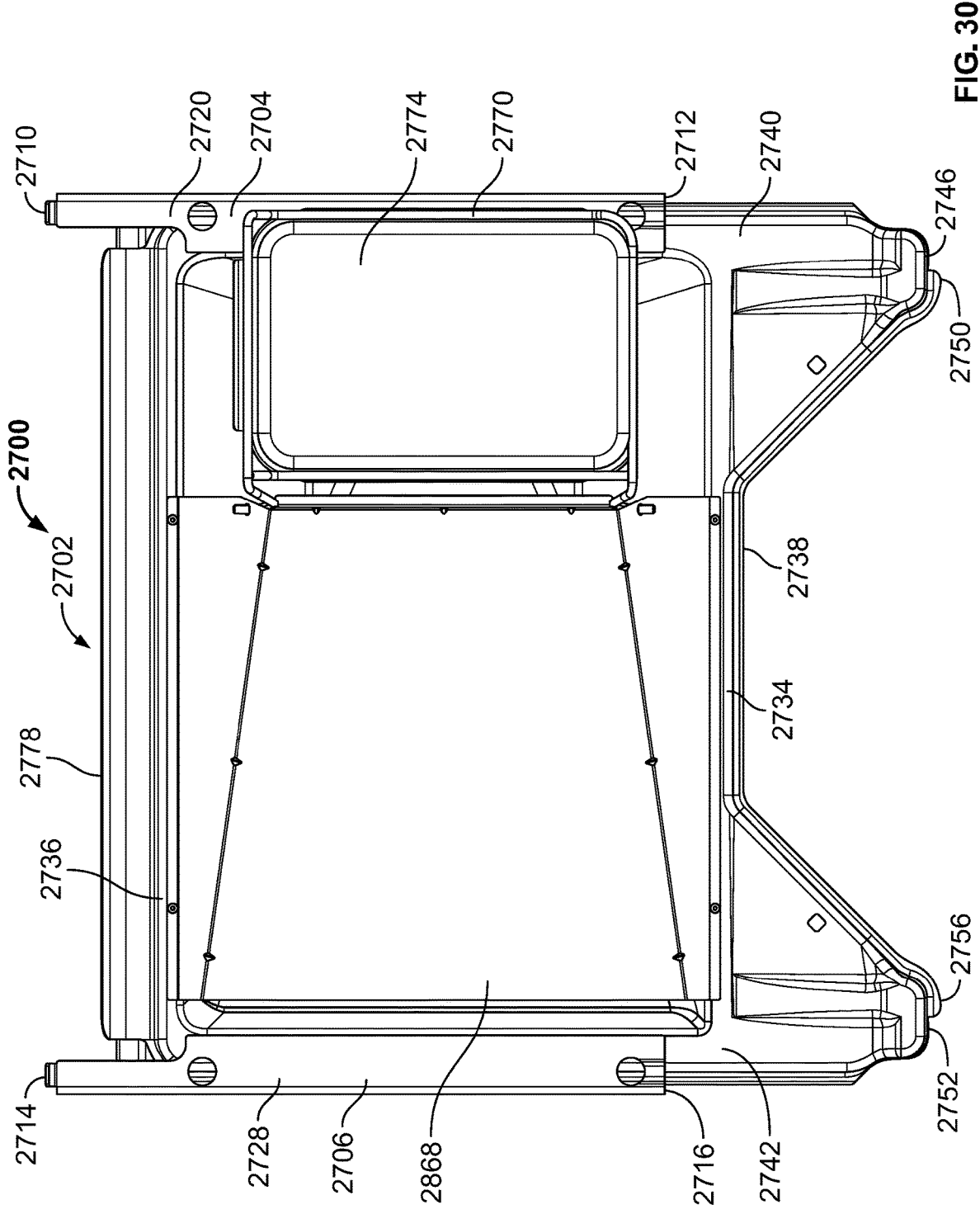
FIG. 30 is a bottom view of the waste management system of FIGS. 27-29, with the waste management system shown positioned in the closed configuration of FIGS. 27-29.
Figure 31:
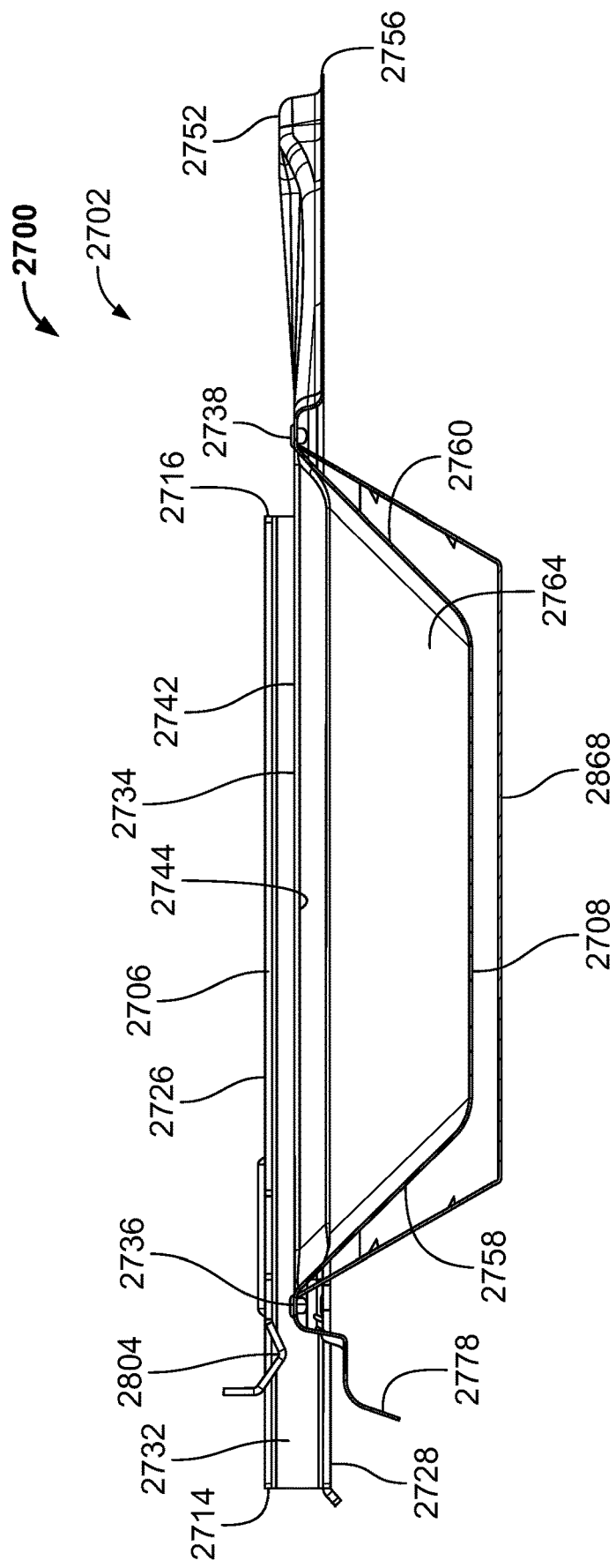
FIG. 31 is a cross-sectional view of the waste management system of FIGS. 27-30 taken along section G-G of FIG. 29, with the waste management system shown positioned in the closed configuration of FIGS. 27-30.
Figure 32:
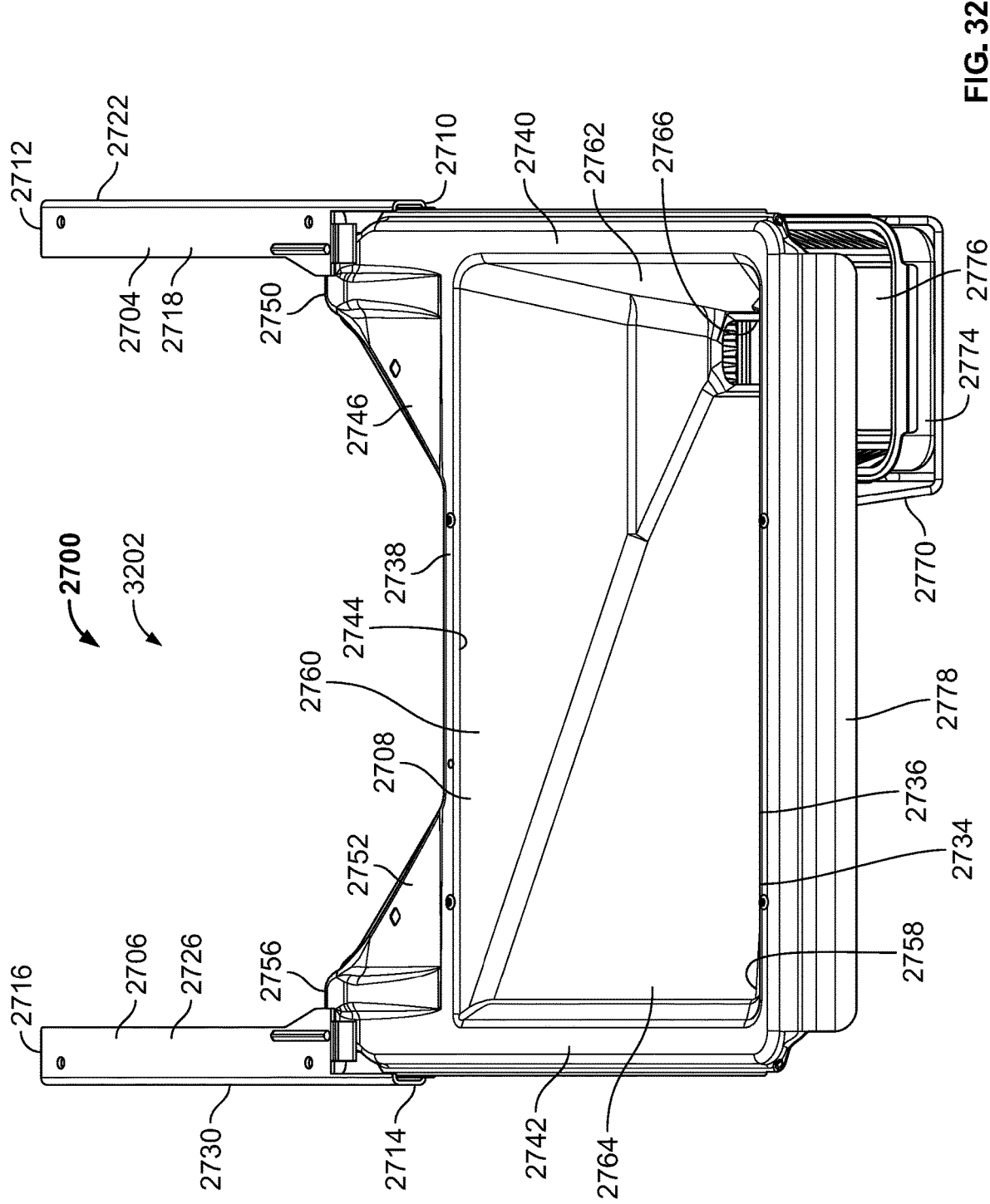
FIG. 32 is a perspective view of the waste management system of FIGS. 27-31, with the waste management system shown positioned in an example open configuration.
Figure 33:
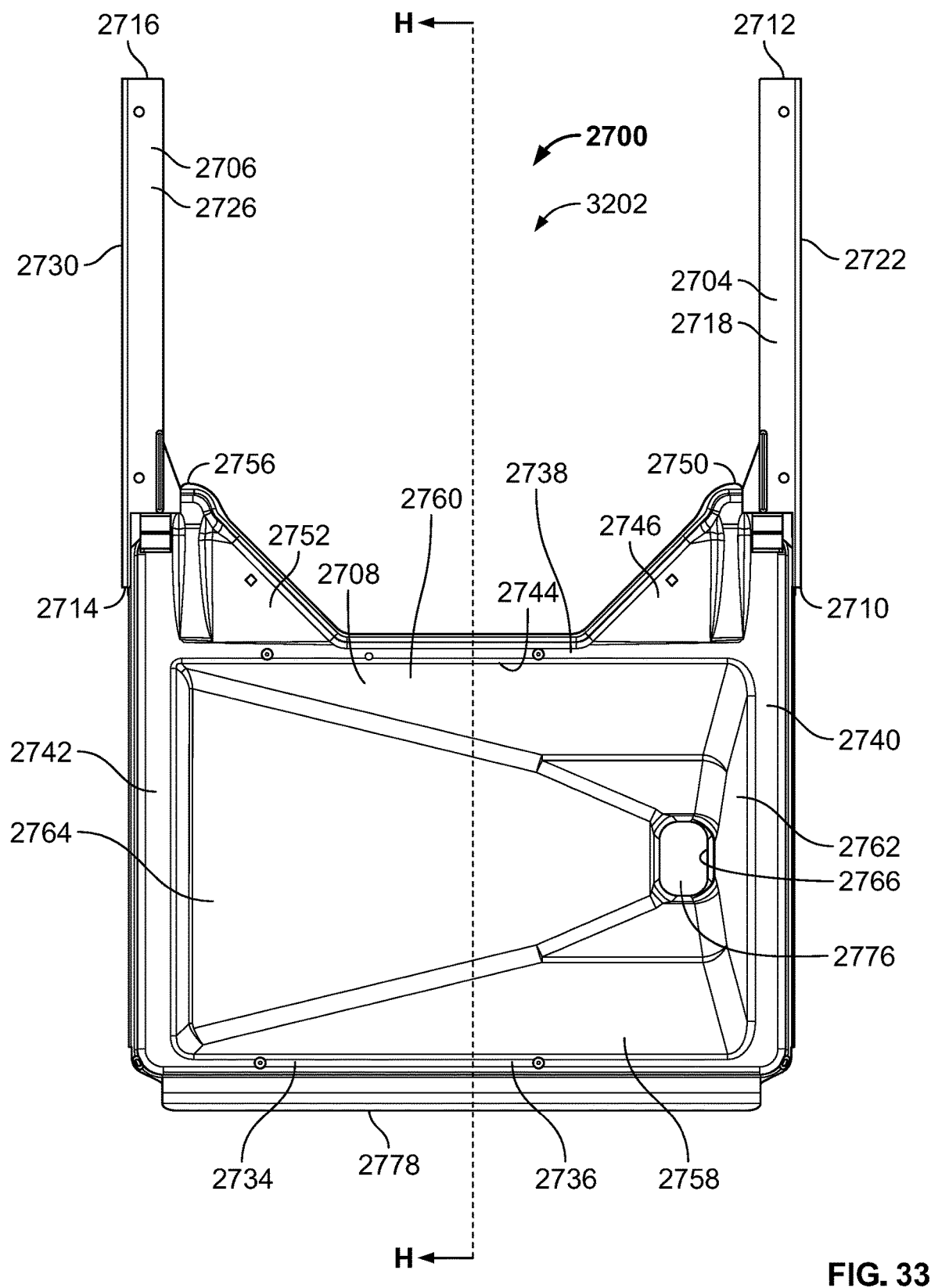
FIG. 33 is a top view of the waste management system of FIGS. 27-32, with the waste management system shown positioned in the open configuration of FIG. 32.
Figure 34:
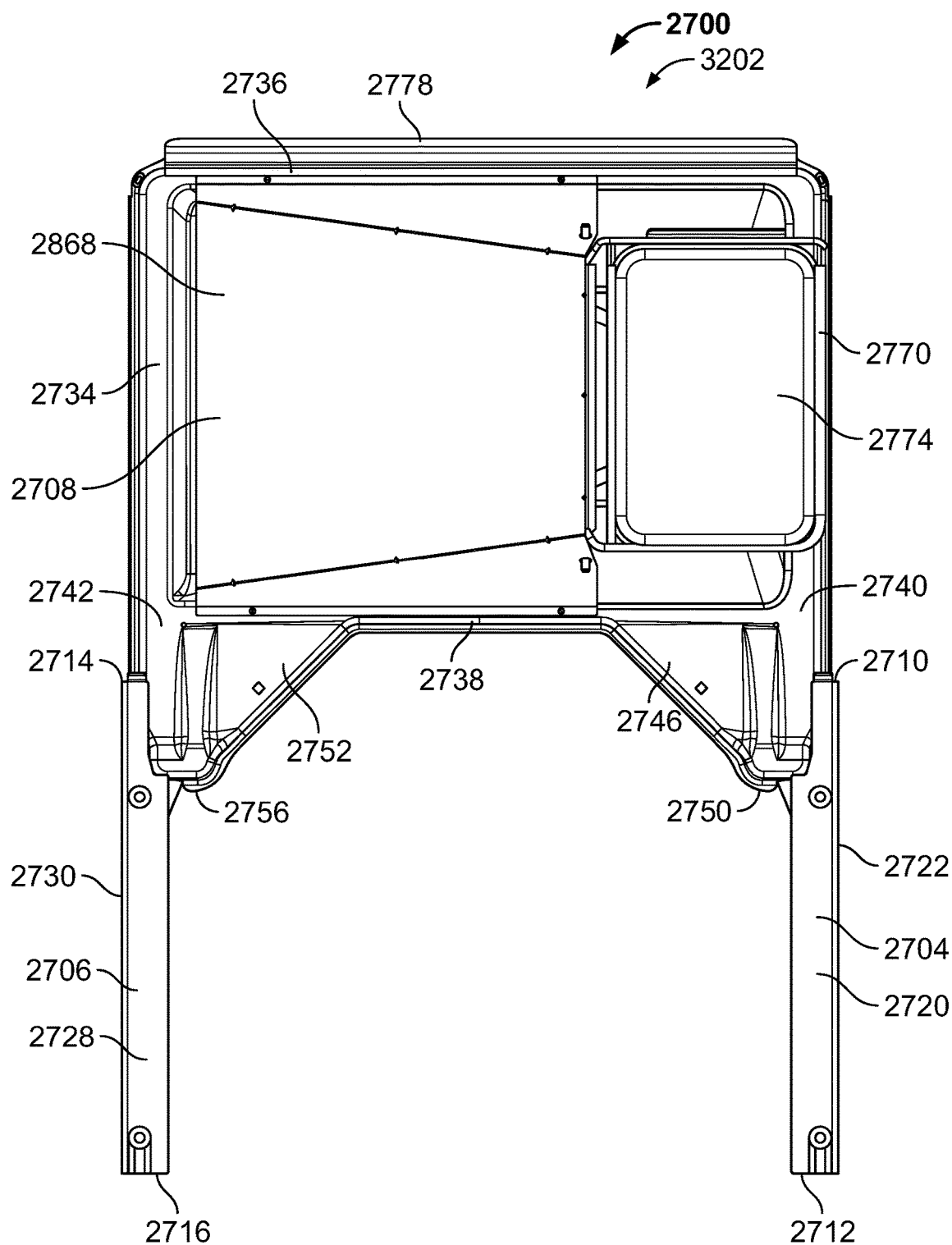
FIG. 34 is a bottom view of the waste management system of FIGS. 27-33, with the waste management system shown positioned in the open configuration of FIGS. 32 and 33.
Figure 35:
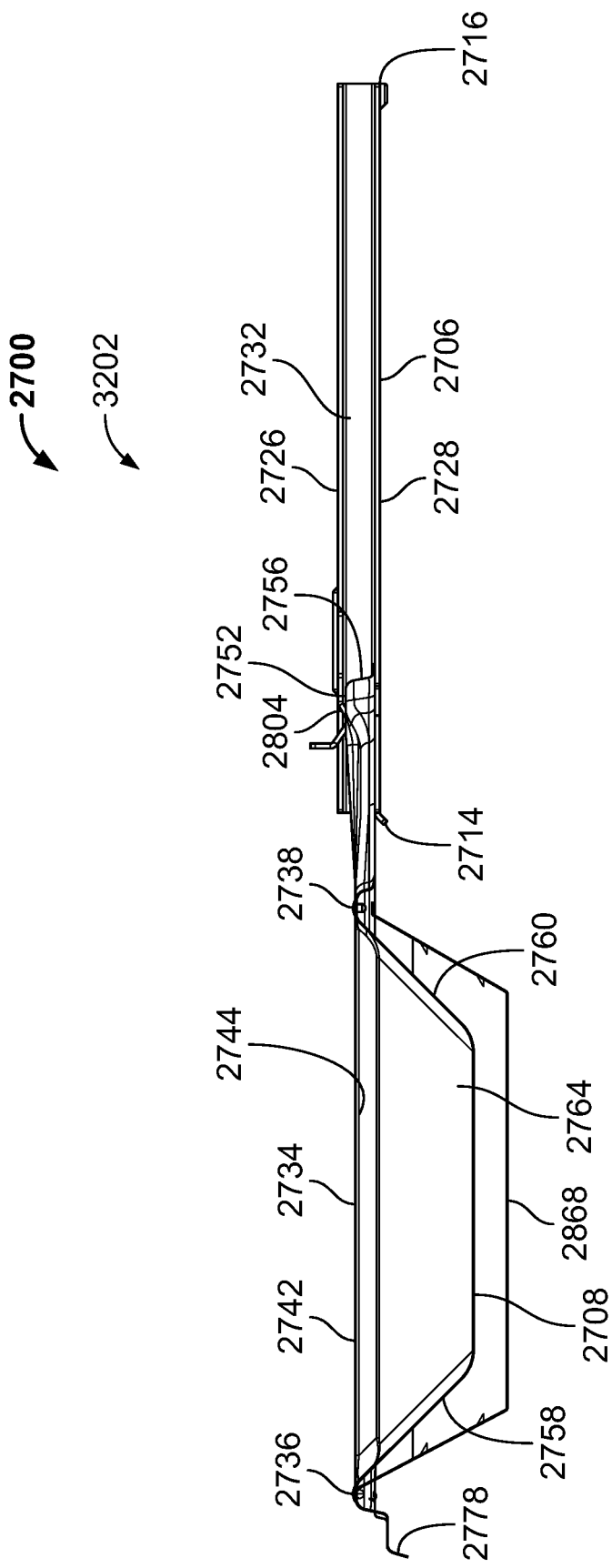
FIG. 35 is a cross-sectional view of the waste management system of FIGS. 27-34 taken along section H-H of FIG. 33, with the waste management system shown positioned in the open configuration of FIGS. 32-34.

FIG. 27 is a perspective view of another example waste management system 2700 constructed in accordance with teachings of this disclosure, with the waste management system 2700 shown positioned in an example closed configuration 2702. FIG. 28 is a front view of the waste management system 2700 of FIG. 27, with the waste management system 2700 shown positioned in the closed configuration 2702 of FIG. 27. FIG. 29 is a top view of the waste management system 2700 of FIGS. 27 and 28, with the waste management system 2700 shown positioned in the closed configuration 2702 of FIGS. 27 and 28. FIG. 30 is a bottom view of the waste management system 2700 of FIGS. 27-29, with the waste management system 2700 shown positioned in the closed configuration 2702 of FIGS. 27-29. FIG. 31 is a cross-sectional view of the waste management system 2700 of FIGS. 27-30 taken along section G-G of FIG. 29, with the waste management system 2700 shown positioned in the closed configuration 2702 of FIGS. 27-30. FIG. 32 is a perspective view of the waste management system 2700 of FIGS. 27-31, with the waste management system 2700 shown positioned in an example open configuration 3202. FIG. 33 is a top view of the waste management system 2700 of FIGS. 27-32, with the waste management system 2700 shown positioned in the open configuration 3202 of FIG. 32. FIG. 34 is a bottom view of the waste management system 2700 of FIGS. 27-33, with the waste management system 2700 shown positioned in the open configuration 3202 of FIGS. 32 and 33. FIG. 35 is a cross-sectional view of the waste management system 2700 of FIGS. 27-34 taken along section H-H of FIG. 33, with the waste management system 2700 shown positioned in the open configuration 3202 of FIGS. 32-34.

The waste management system 2700 of FIGS. 27-35 is structured and/or configured in a manner that is substantially the same as the above-described waste management system 100 of FIGS. 1-9, with the waste management system 2700 of FIGS. 27-35 being movable between the closed configuration 2702 of FIGS. 27-31 and the open configuration 3202 of FIG. 32-35 in the same manner that the waste management system 100 of FIGS. 1-9 is movable between the closed configuration 102 of FIGS. 1-5 and the open configuration 602 of FIGS. 6-9. With regard to correspondence among parts, the waste management system 2700 of FIGS. 27-35 includes an example first guide rail 2704, an example second guide rail 2706, an example waste tray 2708, an example waste bin 2774, and an example disposable waste pan 2776 that are respectively structured and/or configured in a manner that is substantially the same as corresponding ones of the first guide rail 104, the second guide rail 106, the waste tray 108, the waste bin 174, and the disposable waste pan 176 of the waste management system 100 of FIGS. 1-9.

More specifically, the first guide rail 2704 of the waste management system 2700 of FIGS. 27-35 includes an example first end 2710, and example second end 2712, an example upper segment 2718, an example lower segment 2720, an example outer segment 2722, an example inwardly-facing opening 2724, and an example stop tab 2802 that are respectively configured and/or structured in a manner that is substantially the same as corresponding ones of the first end 110, the second end 112, the upper segment 118, the lower segment 120, the outer segment 122, the inwardly-facing opening 124, and the stop tab 202 of the above-described first guide rail 104 of the waste management system 100 of FIGS. 1-9. Similarly, the second guide rail 2706 of the waste management system 2700 of FIGS. 27-35 includes an example first end 2714, and example second end 2716, an example upper segment 2726, an example lower segment 2728, an example outer segment 2730, an example inwardly-facing opening 2732, and an example stop tab 2804 that are respectively configured and/or structured in a manner that is substantially the same as corresponding ones of the first end 114, the second end 116, the upper segment 126, the lower segment 128, the outer segment 130, the inwardly-facing opening 132, and the stop tab 204 of the above-described second guide rail 106 of the waste management system 100 of FIGS. 1-9.

Furthermore, the waste tray 2708 of the waste management system 2700 of FIGS. 27-35 includes an example frame 2734 (having an example front ledge, 2736, an example rear ledge 2738, an example right ledge 2740, and an example left ledge 2742), an example upper opening 2744, an example first flange 2746 (having an example front stop 2748 and an example rear stop 2750), an example second flange 2752 (having an example front stop 2754 and an example rear stop 2756), an example front wall 2758, an example rear wall 2760, an example right sidewall 2762, an example left sidewall 2764, an example lower opening 2766, and an example base 2868 that are respectively configured and/or structured in a manner that is substantially the same as corresponding ones of the frame 134 (having the front ledge, 136, the rear ledge 138, the right ledge 140, and the left ledge 142), the upper opening 144, the first flange 146 (having the front stop 148 and the rear stop 150), the second flange 152 (having the front stop 154 and the rear stop 156), the front wall 158, the rear wall 160, the right sidewall 162, the left sidewall 164, the lower opening 166, and the base 168 of the above-described waste tray 108 of the waste management system 100 of FIGS. 1-9.

The structural differences between the waste management system 2700 of FIGS. 27-35 and the waste management system 100 of FIGS. 1-9 are relatively minimal. As one example, the handle 178 of the waste management system 100 is centralized along the front ledge 136 of the frame 134 of the waste tray 108 of FIGS. 1-9, with the handle 178 extending along only a portion (e.g., less than all) of the lateral extent (e.g., right to left) of the front ledge 136 of the frame 134. By comparison, the handle 2778 of the waste management system 2700 extends along the substantial entirety (e.g., all) of the lateral extent (e.g., right to left) of the front ledge 2736 of the frame 2734 of the waste tray 2708 of FIGS. 27-35. In some examples, the shape and/or the lateral extent of the handle 2778 shown in FIGS. 27-35 improves the ease by which a user may move the warming tray 2208 between the closed configuration 2702 of FIGS. 27-31 and the open configuration 3202 of FIGS. 32-35, and/or the ease by which a user may move the warming tray 2208 relative to the first guide rail 2704 and/or the second guide rail 2706 of the waste management system 2700.

As another example, the waste bin 174 of the waste management system 100 of FIGS. 1-9 is coupled to and/or suspended from the waste tray 108 by the first bracket 170 and the second bracket 172 of the waste management system 100. By comparison, the waste bin 2774 of the waste management system 2700 of FIGS. 27-35 is coupled to and/or suspended from the waste tray 2708 by an example wire form 2770 of the waste management system 2700, with the wire form 2770 being structured and/or configured to support and/or carry the waste bin 2774. In some examples, the shape of the wire form 2770 shown in FIGS. 27-35 improves the ease by which a user may remove the waste bin 2774 from the waste management system 2700, and/or the ease by which a user may remove the disposable waste pan 2776 from the waste bin 2774 of the waste management system 2700.

Aside from the above-identified differences, the waste management system 2700 of FIGS. 27-35 is structured and/or configured in a manner that is substantially the same as the above-described waste management system 100 of FIGS. 1-9, with the waste management system 2700 of FIGS. 27-35 being movable between the closed configuration 2702 of FIGS. 27-31 and the open configuration 3202 of FIG. 32-35 in the same manner that the waste management system 100 of FIGS. 1-9 is movable between the closed configuration 102 of FIGS. 1-5 and the open configuration 602 of FIGS. 6-9. A user of a grill including the waste management system 2700 of FIGS. 27-35 can transition the waste management system 2700 from the closed configuration 2702 shown in FIGS. 27-31 into the open configuration 3202 shown in FIGS. 32-35 by pulling the handle 2778 of the waste management system 2700 in a forward direction. Conversely, the user can transition the waste management system 2700 of FIGS. 27-35 from the open configuration 3202 shown in FIGS. 32-35 into the closed configuration 2702 shown in FIGS. 27-31 by pushing the handle 2778 of the waste management system 2700 in a rearward direction. Transitioning the waste management system 2700 from the closed configuration 2702 shown in FIGS. 27-31 into the open configuration 3202 shown in FIGS. 32-35 advantageously enables the user to more easily clean and/or remove waste (e.g., grease, ash, and/or other residual cooking matter) from the waste tray 2708, the waste bin 2774, and/or the disposable waste pan 2776 relative to the effort which the user would otherwise exert to clean and/or remove such waste from the waste tray 2708, the waste bin 2774, and/or the disposable waste pan 2776 when the waste management system 2700 is in the closed configuration 2702.

The waste management system 2700 of FIGS. 27-35 is structured and/or configured to be supported by and/or coupled to the cookbox 1008 of the grill 1002 of FIGS. 10-26 in the same manner that the waste management system 100 of FIGS. 1-9 is supported by and/or coupled to the cookbox 1008 of the grill 1002, as shown in FIGS. 10-26 and described above. In this regard, the waste management system 2700 of FIGS. 27-35 is structured and/or configured to be coupled to the cookbox 1008 of FIGS. 10-26 via the first guide rail 2704 and the second guide rail 2706 of the waste management system 2700. More specifically, the first guide rail 2704 of the waste management system 2700 can be coupled (e.g., rigidly and/or fixedly coupled) to the bottom of the cookbox 1008 at a location to the right of the lower opening 1702 of the cookbox 1008 (e.g., at a location proximate and/or along the right sidewall 1406 of the cookbox 1008), and the second guide rail 2706 of the waste management system 2700 can be coupled (e.g., rigidly and/or fixedly coupled) to the bottom of the cookbox 1008 at a location to the left of the lower opening 1702 of the cookbox 1008 (e.g., at a location proximate and/or along the left sidewall 1408 of the cookbox 1008).

When the waste management system 2700 is in the closed configuration 2702 shown in FIGS. 27-31 and coupled to the cookbox 1008 of the grill 1002, the first guide rail 2704, the second guide rail 2706, and the waste tray 2708 of the waste management system 2700 will be located below the cookbox 1008, and the upper opening 2744 of the waste tray 2708 of the waste management system 2700 will be located below and vertically aligned with the lower opening 1702 of the cookbox 1008. Conversely, when the waste management system 2700 is in the open configuration 3202 shown in FIGS. 32-35 and coupled to the cookbox 1008 of the grill 1002, the first guide rail 2704 and the second guide rail 2706 of the waste management system 2700 will remain located below the cookbox 1008, but the upper opening 2744 of the waste tray 2708 of the waste management system 2700 will no longer be located below and vertically aligned with the lower opening 1702 of the cookbox 1008. Instead, the upper opening 2744 of the waste tray 2708 of the waste management system 2700 will be located forward of the lower opening 1702 of the cookbox 1008 and/or, more generally, forward of the cookbox 1008 and/or the base 1010 of the grill 1002.

From the foregoing, it will be appreciated that example waste management systems disclosed herein are advantageously configured to be movable (e.g., slidable) relative to a cookbox of a grill, with a waste tray of the waste management systems being movable (e.g., slidable) from a closed configuration relative to the cookbox into an open configuration relative to the cookbox. Example waste management systems disclosed herein are advantageously moveable (e.g., slidable) between the aforementioned closed and open configurations via a handle coupled to the front of the waste tray and/or, more generally, to the front of the waste management system. Transitioning the waste management system from the closed configuration into the open configuration advantageously enables the user to more easily clean and/or remove waste (e.g., grease, ash, and/or other residual cooking matter) from the waste tray relative to the effort which the user would otherwise exert to clean and/or remove such waste from the waste tray in the absence of the waste management system. In this regard, the user can simply slide the waste tray of the waste management system forward from beneath the cookbox, with the interior of the waste tray then being freely accessible to the user, and with the waste tray advantageously being suspended in place at such a location via support rails of the waste management system. The ability to easily place the waste tray in such a position provides a superior cleanability option relative to those provided by the known waste management systems described above.

Example waste management system disclosed herein further include a waste bin that is advantageously coupled to, and movable (e.g., slidable) along with, the waste tray of the waste management system. As a result of the waste bin being coupled to the waste tray, waste that is removed off of and/or out of the waste tray via a lower opening of the waste tray while the waste management system is in the open configuration will be captured and/or collected in the underlying waste bin. For example, the aforementioned arrangement between the waste tray and the waste bin enables a user to scrape (e.g., via a scraping tool) waste from a location on the waste tray toward, into, and/or through the lower opening of the waste tray, with such waste thereafter passing into the underlying waste bin. Such waste removal can advantageously be performed by the user in a manner that is generally hands-free, with the exception of the user having to hold the scraping tool. The ability to perform waste removal in a manner that is effectively hands-free further enhances the superior cleanability options provided by the disclosed waste management systems relative to those provided by the known waste management systems described above.

Example slidable waste management systems for cookboxes of grills are disclosed. In some examples, a waste management system configured to be coupled to a cookbox of a grill is disclosed. In some disclosed examples, the waste management system comprises a first guide rail couplable to the cookbox and a second guide rail couplable to the cookbox. In some disclosed examples, the waste management system further comprises a waste tray slidably coupled to the first guide rail and the second guide rail. In some disclosed examples, the waste tray is movable between a closed configuration and an open configuration. In some disclosed examples, the waste tray has an upper opening and a lower opening. In some disclosed examples, the upper opening is configured to receive waste from the cookbox when the waste tray is in the closed configuration. In some disclosed examples, the waste management system further comprises a waste bin coupled to and located below the waste tray. In some disclosed examples, the waste bin is configured to receive the waste from the waste tray via the lower opening.

In some disclosed examples, the waste management system further comprises a handle coupled to the waste tray.

In some disclosed examples, the handle is located along a front ledge of a frame of the waste tray.

In some disclosed examples, the handle is centralized along the front ledge. In some disclosed examples, the handle extends along only a portion of a lateral extent of the front ledge.

In some disclosed examples, the handle extends along an entirety of a lateral extent of the front ledge.

In some disclosed examples, the first guide rail includes a stop tab, and the waste tray includes a front stop configured to selectively engage the stop tab of the first guide rail to prevent the waste tray from sliding off of the first guide rail in a forward direction.

In some disclosed examples, the second guide rail includes a stop tab, and the waste tray includes a front stop configured to selectively engage the stop tab of the second guide rail to prevent the waste tray from sliding off of the second guide rail in the forward direction.

In some disclosed examples, the waste tray includes a first flange having a rear stop configured to selectively engage an interior surface of a rear wall of a base of the grill to prevent the waste tray from sliding off of the first guide rail in a rearward direction.

In some disclosed examples, the waste tray includes a second flange having a rear stop configured to selectively engage the interior surface of the rear wall of the base of the grill to prevent the waste tray from sliding off of the second guide rail in the rearward direction.

In some disclosed examples, the waste bin is configured to receive a disposable waste pan, the disposable waste pan configured to receive the waste from the waste tray via the lower opening.

In some disclosed examples, the waste bin is coupled to the waste tray via a first bracket and a second bracket, the second bracket being spaced apart from the first bracket.

In some disclosed examples, the waste bin is coupled to the waste tray via a wire form.

In some examples, a waste management system configured to be coupled to a cookbox of a grill is disclosed. In some disclosed examples, the waste management system comprises a first guide rail couplable to the cookbox and a second guide rail couplable to the cookbox. In some disclosed examples, the waste management system further comprises a waste tray slidably coupled to the first guide rail and the second guide rail. In some disclosed examples, the waste tray is movable between a closed configuration and an open configuration. In some disclosed examples, the waste tray has an upper opening and a lower opening. In some disclosed examples, the upper opening is configured to receive waste from the cookbox when the waste tray is in the closed configuration. In some disclosed examples, the waste management system further comprises a waste bin coupled to and located below the waste tray. In some disclosed examples, the waste bin is configured to receive the waste from the waste tray via the lower opening. In some disclosed examples, the waste bin is configured to move between the closed configuration and the open configuration as the waste tray moves between the closed configuration and the open configuration.

In some disclosed examples, the waste management system further comprises a handle coupled to the waste tray.

In some disclosed examples, the handle is located along a front ledge of a frame of the waste tray.

In some disclosed examples, the handle extends along an entirety of a lateral extent of the front ledge.

In some disclosed examples, the first guide rail includes a stop tab, and the waste tray includes a front stop configured to selectively engage the stop tab of the first guide rail to prevent the waste tray from sliding off of the first guide rail in a forward direction.

In some disclosed examples, the second guide rail includes a stop tab, and the waste tray includes a front stop configured to selectively engage the stop tab of the second guide rail to prevent the waste tray from sliding off of the second guide rail in the forward direction.

In some disclosed examples, the waste tray includes a first flange having a rear stop configured to selectively engage an interior surface of a rear wall of a base of the grill to prevent the waste tray from sliding off of the first guide rail in a rearward direction.

In some disclosed examples, the waste tray includes a second flange having a rear stop configured to selectively engage the interior surface of the rear wall of the base of the grill to prevent the waste tray from sliding off of the second guide rail in the rearward direction.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A grill, comprising:
a cookbox including a front wall, a rear wall, a right sidewall, a left sidewall, and a lower opening, the lower opening of the cookbox located between the front wall, the rear wall, the right sidewall, and the left sidewall of the cookbox;
a first guide rail coupled to the cookbox;
a second guide rail coupled to the cookbox;
a waste tray supported by and slidably coupled to the first guide rail and the second guide rail, the waste tray being movable between a closed configuration and an open configuration, the waste tray having an upper opening, a lower opening, and sloped walls, the sloped walls located between the upper opening and the lower opening of the waste tray, the sloped walls angled inwardly toward the lower opening of the waste tray, the upper opening and the sloped walls of the waste tray configured to receive waste passing downward through the lower opening of the cookbox when the waste tray is in the closed configuration, the upper opening of the waste tray further configured to be located entirely forward of the front wall of the cookbox when the waste tray is in the open configuration with the waste tray remaining supported by the first guide rail and the second guide rail; and
a waste bin located below, suspended from, and removably coupled to the waste tray, the waste bin configured to receive the waste from the waste tray as the waste passes downward through the lower opening of the waste tray when the waste bin is coupled to the waste tray.

2. The grill of claim 1, further comprising a handle coupled to the waste tray.

3. The grill of claim 2, wherein the handle is located along a front ledge of a frame of the waste tray, the handle extending along only a portion of a lateral extent of the front ledge.

4. The grill of claim 2, wherein the handle is located along a front ledge of a frame of the waste tray, the handle extending along an entirety of a lateral extent of the front ledge.

5. The grill of claim 1, wherein the first guide rail includes a first stop tab, the second guide rail includes a second stop tab, and the waste tray includes a first front stop and a second front stop, wherein the first front stop is configured to selectively engage the first stop tab to prevent the waste tray from sliding off of the first guide rail in a forward direction and the second front stop is configured to selectively engage the second stop tab to prevent the waste tray from sliding off of the second guide rail in the forward direction.

6. The grill of claim 1, wherein the waste tray includes a first flange having a first rear stop configured to selectively engage an interior surface of a rear wall of a base of the grill to prevent the waste tray from sliding off of the first guide rail in a rearward direction, and the waste tray includes a second flange having a second rear stop configured to selectively engage the interior surface of the rear wall of the base of the grill to prevent the waste tray from sliding off of the second guide rail in the rearward direction.

7. The grill of claim 1, wherein the waste bin is configured to receive a disposable waste pan, the disposable waste pan configured to receive the waste from the waste tray as the waste passes downward through the lower opening of the waste tray.

8. The grill of claim 1, wherein the waste bin is suspended from and removably coupled to the waste tray via a first bracket and a second bracket, the second bracket being spaced apart from the first bracket.

9. The grill of claim 1, wherein the waste bin is suspended from and removably coupled to the waste tray via a wire form.

10. The grill of claim 1, wherein the waste tray includes a frame having a front ledge, a rear ledge, a right ledge, and a left ledge, wherein the front ledge, the rear ledge, the right ledge, and the left ledge collectively define the upper opening of the waste tray, wherein at least a portion of the rear ledge is located forward of the front wall of the cookbox when the waste tray is in the open configuration with the waste tray remaining supported by the first guide rail and the second guide rail.

11. The grill of claim 1, wherein the first guide rail and the second guide rail respectively have a C-shaped cross-sectional profile including an upper segment, a lower segment, and an outer segment extending between the upper segment and the lower segment, wherein the upper segment of the first guide rail and the upper segment of the second guide rail are coupled to the cookbox, wherein the lower segment of the first guide rail and the lower segment of the second guide rail support the waste tray when the waste tray is in the closed configuration and also when the waste tray is in the open configuration, and wherein the outer segment of the first guide rail and the outer segment of the second guide rail laterally bound the waste tray.

12. The grill of claim 1, wherein the waste bin is configured to be removable from the waste tray when the waste tray is in the open configuration and also when the waste tray is in the closed configuration.

13. The grill of claim 1, wherein the upper opening of the waste tray circumscribes and is located below the lower opening of the cookbox, wherein the lower opening of the waste tray is smaller than the upper opening of the waste tray, and wherein the sloped walls of the waste tray are configured to feed the waste that is received from the lower opening of the cookbox toward the lower opening of the waste tray.

14. A grill, comprising:
a cookbox including a front wall, a rear wall, a right sidewall, a left sidewall, and a lower opening, the lower opening of the cookbox located between the front wall, the rear wall, the right sidewall, and the left sidewall of the cookbox;
a first guide rail coupled to the cookbox;
a second guide rail coupled to the cookbox;
a waste tray supported by and slidably coupled to the first guide rail and the second guide rail, the waste tray being movable between a closed configuration and an open configuration, the waste tray having an upper opening, a lower opening, and sloped walls, the sloped walls located between the upper opening and the lower opening of the waste tray, the sloped walls angled inwardly toward the lower opening of the waste tray, the upper opening and the sloped walls of the waste tray configured to receive waste passing downward through the lower opening of the cookbox when the waste tray is in the closed configuration, the upper opening of the waste tray further configured to be located entirely forward of the front wall of the cookbox when the waste tray is in the open configuration with the waste tray remaining supported by the first guide rail and the second guide rail; and a waste bin located below, suspended from, and removably coupled to the waste tray, the waste bin configured to receive the waste from the waste tray as the waste passes downward through the lower opening of the waste tray when the waste bin is coupled to the waste tray, the waste bin configured to move in unison with the waste tray as the waste tray moves between the closed configuration and the open configuration.

15. The grill of claim 14, further comprising a handle located along and coupled to a front ledge of a frame of the waste tray, the handle extending along an entirety of a lateral extent of the front ledge.

16. The grill of claim 14, wherein the first guide rail includes a first stop tab, the second guide rail includes a second stop tab, and the waste tray includes a first front stop and a second front stop, wherein the first front stop is configured to selectively engage the first stop tab to prevent the waste tray from sliding off of the first guide rail in a forward direction, and the second front stop is configured to selectively engage the second stop tab to prevent the waste tray from sliding off of the second guide rail in the forward direction.

17. The grill of claim 14, wherein the waste tray includes a first flange having a first rear stop configured to selectively engage an interior surface of a rear wall of a base of the grill to prevent the waste tray from sliding off of the first guide rail in a rearward direction, and the waste tray includes a second flange having a second rear stop configured to selectively engage the interior surface of the rear wall of the base of the grill to prevent the waste tray from sliding off of the second guide rail in the rearward direction.

18. The grill of claim 14, wherein the waste tray includes a frame having a front ledge, a rear ledge, a right ledge, and a left ledge, wherein the front ledge, the rear ledge, the right ledge, and the left ledge collectively define the upper opening of the waste tray, wherein at least a portion of the rear ledge is located forward of the front wall of the cookbox when the waste tray is in the open configuration with the waste tray remaining supported by the first guide rail and the second guide rail.

19. The grill of claim 14, wherein the first guide rail and the second guide rail respectively have a C-shaped cross-sectional profile including an upper segment, a lower segment, and an outer segment extending between the upper segment and the lower segment, wherein the upper segment of the first guide rail and the upper segment of the second guide rail are coupled to the cookbox, wherein the lower segment of the first guide rail and the lower segment of the second guide rail support the waste tray when the waste tray is in the closed configuration and also when the waste tray is in the open configuration, and wherein the outer segment of the first guide rail and the outer segment of the second guide rail laterally bound the waste tray.

20. The grill of claim 14, wherein the waste bin is configured to be removable from the waste tray when the waste tray is in the open configuration and also when the waste tray is in the closed configuration.

21. The grill of claim 14, wherein the waste bin is suspended from and removably coupled to the waste tray via a wire form.

\* \* \* \* \*